United States Patent
Tahara

[11] Patent Number: 5,633,682
[45] Date of Patent: May 27, 1997

[54] STEREOSCOPIC CODING SYSTEM

[75] Inventor: Katsumi Tahara, Kanagawa, Japan

[73] Assignee: Sony Corporation, Tokyo, Japan

[21] Appl. No.: 327,364

[22] Filed: Oct. 21, 1994

[30] Foreign Application Priority Data

Oct. 22, 1993 [JP] Japan .................................. 5-264511

[51] Int. Cl.$^6$ .............................. H04N 7/32; H04N 13/00
[52] U.S. Cl. .............................. 348/384; 348/42; 348/43; 348/400; 348/413
[58] Field of Search .................. 348/43, 42, 44, 348/46, 48, 51, 384, 394, 400–407, 409–413, 416; H04N 7/32, 13/00

[56] References Cited

U.S. PATENT DOCUMENTS

| 4,704,627 | 11/1987 | Yuyama et al. | 348/51 |
|---|---|---|---|
| 4,743,965 | 5/1988 | Yamada et al. | 348/51 |
| 5,043,806 | 8/1991 | Choquet et al. | 348/43 |
| 5,091,782 | 2/1992 | Krause et al. | 348/416 |
| 5,193,000 | 3/1993 | Lipton et al. | 348/51 |
| 5,296,926 | 3/1994 | Nagura | 348/43 |
| 5,416,510 | 5/1995 | Lipton et al. | 348/43 |

OTHER PUBLICATIONS

Manfred Ziegler, "Digital Stereoscopic Imaging & Applications A Way Towards New Dimensions The RACE II Project Ditima", IEEE Colloq. 1992, No. 173: Stereoscopic Television, pp. 6/1–6/4 1992.

Chiari, A., "Depth Information Aided Imaging Coding", IEEE Colloq. 1992, No. 173: Stereoscopic Television, pp. 10/1–10/8 1992.

Fukuhara, T., Umahashi, A., and Murakami, T., "3–D Motion Estimation For Model–Based Image Coding", Image Processing and Its Applications, IEEE Conf. Pub. 354, 1992, pp. 69–72 1992.

Seferidis, V.E., and Papadimitriou, D.V., "Improved Disparity Estimation in Stereoscopic Television", Electronics Letters, vol. 29, Iss. 9, Apr. 29, 1993, pp. 782–783 1993.

Sand, R. "3–DTV A Review of Recent and Current Developments", IEEE Colloq. 1992, No. 173: Stereoscopic Television, pp. 1/1–1/4 1992.

Schertz, A., "Source Coding of Stereoscopic Television Pictures", Image Processing and Its Applications, IEEE Conf. Pub. 354, 1992, pp. 462–464 1992.

Yamaguchi, Hiroyuki, Takehira, Yasushi, Akiyama, Kenji, and Kobayashi, Yukio, "Stereoscopic Images Disparity for Predictive Coding", ICASSP '89: Acoustics, Speech & Signal Processing Conference, pp. 1976–1979 1989.

Gomi, Kazuhiro, Nishino, Yutaka, Tai, Kazuhumi, Yasuda, Minour, and Tetsutani, Nobuji, "Stereoscopic Video Transmission and Presentation System for ISDN", IEEE Trans. on Consumer Electronics, 1990, pp. 759–766 1990.

Perkins, Michael G., "Data Compression of Stereopairs", IEEE Trans. on Comm., vol. 40, No. 4, Apr., 1992, pp. 684–696 1992.

Dinstein, I., Guy, G., Rabany, J., Tzelgov, J., and Henik, A., "On Stereo Image Coding", Pattern Recognition, 1988 9th International Conference, pp. 357–359 1988.

Dumbreck, A.A., and Smith, C.W., "3–D Displays for Industrial Applications", IEEE Colloq. 1992, No. 173: Stereoscopic Television, pp. 7/1–7/4 1992.

Primary Examiner—Howard W. Britton
Assistant Examiner—Vu Le
Attorney, Agent, or Firm—William S. Frommer; Alvin Sinderbrand

[57] ABSTRACT

A coding system for transmitting stereo image data, wherein an image for the left eye is disposed in odd fields and an image for the right eye is disposed in even fields, respectively. Frames F1, F2, F3 and F4 are sequentially coded in an order of I picture, B picture, P picture and B picture. The picture in each frame is coded by adaptively switching between a frame prediction mode or field prediction mode or a frame DCT mode or field DCT mode. Thereby, the parallax can be efficiently coded.

26 Claims, 23 Drawing Sheets

ENCODER BLOCK DIAGRAM

Frame Prediction Mode

———————— Data of First Field
– – – – – – – – Data of Second Field

FRAME/FIELD PREDICTION MODE

Field Prediction Mode

——————— Data of First Field
————————— Data of Second Field

FRAME/FIELD PREDICTION MODE

Frame DCT Mode

———————— Data of First Field
— — — — — — Data of Second Field

FRAME/FIELD DCT MODE

FRAME/FIELD DCT MODE

Odd Field

Image for Right Eye
206

Even Field

FIG. 17 CODING OF STEREO IMAGE USING FIELD PREDICTION

CODING OF STEREO IMAGE BY FIELD DIRECTION USING P PICTURE

FIG.21

| Odd Field is Displayed | Open Left Eye Shutter |
| --- | --- |
|  | Close Left Eye Shutter |
| Even Field is Displayed | Open Right Eye Shutter |
|  | Close Right Eye Shutter |

PRINCIPLE OF STEREO IMAGE

EXAMPLE OF STEREO IMAGE

STEREOSCOPIC CODING SYSTEM

BACKGROUND OF THE INVENTION

1. Field of the Invention

The present invention relates to an image signal recording method and image signal recording unit, image signal reproducing method and image signal reproducing unit, image signal coding method and image signal coding unit, image signal decoding method and image signal decoding unit and image signal recording medium suitably used in recording a stereoscopic dynamic image signal in a recording medium such as a magneto-optic disk and magnetic tape for example, reproducing it to display on a stereoscopic display, transmitting it from the sending side to the receiving side via a transmission path and receiving it on the receiving side to stereoscopically display through a TV conference system, TV telephone system, broadcasting equipment and the like.

2. Description of the Related Art

FIG. 22 shows a principle of stereoscopic image. Generally a stereoscopic is a technique for bringing about a stereoscopic feeling in an image by giving different images to left and right human eyes by taking account of its parallax. In FIG. 22, an object 203 is projected on a screen 204 from each point of view of a left eye 201 and right eye 202 to obtain an image for left eye 201 and image for right eye 206. Accordingly, it becomes possible to stereoscopically show the object 203 as if it is floating out of the screen 204 even when the object 203 does not actually exist by giving the image for left eye 205 to the left eye 201 and the image for right eye 206 to the right eye 202 by some technique.

FIG. 23 shows an example of the stereo image thus obtained. As shown in the figure, the image for left eye 205 is disposed in odd fields and the image for right eye 206 is disposed in even fields, respectively, utilizing the interlace-scanned fields. A heavy interlaced structure corresponding to the parallax is seen in this stereo image. That is, the image for left eye 205 and image for right eye 206 which are originally a continuous one image (line) are shifted considerably to the left and right. Conventionally, the image thus produced has been recorded as it is in analog in a recording medium such as a magnetic tape, as shown in the U.S. Pat. No. 4,523,226 patented on Jun. 11, 1985 for example.

By the way, if a high efficient coding is applied to the image having a heavy interlaced structure such as shown in FIG. 23, a coding efficiency stagnates and an image quality drops because a very high frequency is concentrated around the edge of the object.

Accordingly, it is an object of the present invention to solve the aforementioned problem by providing means for efficiently coding even an image whose edge is heavily disturbed due to the interlacing, without degrading the image quality.

SUMMARY OF THE INVENTION

An image signal recording unit of the present invention comprises:

first producing means (e.g., video cameras 41 and 42 in FIG. 5) for producing an image for left eye and image for right eye taking account of a parallax of the both eyes by stereoscopic;

second producing means (e.g., a composite circuit 43 in FIG. 5) for producing a stereo image signal by disposing the image for left eye and image for right eye respectively in one or another of first and second fields;

coding means (e.g., an encoder 18 in FIG. 6) for compressing and coding the stereo image signal; and recording means (e.g., a recording circuit 19 in FIG. 6) for digitally recording the compressed and coded signal in a recording medium.

An image signal decoding unit of the present invention comprises:

reproducing means (e.g., a reproducing circuit 30 in FIG. 6) for reproducing a recorded signal from the image signal recording medium in which the stereo image signal produced by disposing the image for left eye and image for right eye respectively in one or another of the first and second fields of the TV signal is coded and digitally recorded;

decoding means (e.g., a decoder 31 in FIG. 6) for decoding the reproduced signal;

converting means (e.g., a format converting means 32 in FIG. 6) for converting the decoded signal to a TV signal;

displaying means (e.g., a CRT 101 in FIG. 20) for displaying the converted TV signal;

forbidding means (e.g., a left eye shutter 103 and right eye shutter 104 in FIG. 20) for synchronously forbidding the image for left eye from entering the right eye when the image for left eye is displayed on the displaying means and synchronously forbidding the image for right eye from entering the left eye when the image for right eye is displayed on the displaying means.

An image signal coding unit of the present invention for producing the image for left eye and image for right eye taking account of the parallax of the both eyes by stereoscopic;

for producing the stereo image signal by disposing the image for left eye and image for right eye respectively in one and another of the first and second fields composing the frame of the TV signal; and for compressing and coding the stereo image signal, comprises:

predictive coding means (e.g., an operating section 53 in FIG. 8) for dividing the stereo image signal with a unit of block in the frame and adaptively selecting either a first prediction mode in which the signals in the first and second fields are mixed or a second prediction mode in which the signals in the first and second fields are not mixed to predictively code the signal in the block;

operating means (e.g., a DCT circuit 56 in FIG. 8) for implementing a predetermined operation on the predictively coded signal;

quantization means (e.g., a quantization circuit 57 in FIG. 8) for quantizing the signal obtained by the operation; and variable length coding means (e.g., a variable length coding circuit 58 in FIG. 8) for variable length coding the quantized signal.

An image signal decoding unit of the present invention for decoding the signal transmitted by compressing and coding the stereo image signal in which the image for left eye and image for right eye produced by taking account of the parallax of the both eyes by stereoscopic are disposed respectively in one and another of the first and second fields composing the frame of the TV signal, comprises:

variable length decoding means (e.g., a variable length decoding circuit 82 in FIG. 13) for variable length decoding the input signal and for separating a prediction flag indicating that in which prediction mode the stereo image signal divided with the unit of block in the frame has been predictively coded, i.e., a first prediction mode in which the signals in the first and second fields are mixed and a second prediction mode in which the signals in the first and second fields are not mixed, at the time of predictive coding;

inverse quantization means (e.g., a inverse quantization circuit 83 in FIG. 13) for inversely quantizing the signal variable length decoded by the variable length decoding means;

inverse operating means (e.g., an IDCT circuit 84 in FIG. 13) for implementing a predetermined operation inversive from that in coding on the signal inversely quantized by the inverse quantization means;

producing means (e.g., a motion compensating circuit 88 in FIG. 13) for producing a prediction error signal which corresponds to the signal in the block in either state of the state in which the signals in the first and second fields are mixed or the state in which the signals in the first and second fields are not mixed based on the prediction flag; and decoding means (e.g., an operator 86 in FIG. 13) for decoding the operated signal in the block by using the prediction error signal.

When one group is formed by a plurality of frames, first and second fields of a first frame in the group may be both designated as I picture, first and second fields of a second frame may be both designated as B picture, first and second fields of a third frame may be both designated as P picture and first and second fields of a fourth frame and thereafter may be both designated as B or P picture alternately.

According to the present invention, the image for left eye and image for right eye produced by the stereoscopic are disposed in one or another of the first field and second field of the television signal. Then, they are predictively coded or DCT transformed per every field. Or, they are predictively coded or DCT transformed adaptively per every field or frame. Accordingly, the stereo image may be efficiently coded without degrading its quality.

The above and other advantages of the present invention will become more apparent in the following description and the accompanying drawings.

BRIEF DESCRIPTION OF THE DRAWINGS

FIG. 21 is a table for explaining an operation of an electronic shutter controller 102 in FIG. 20;

DETAILED DESCRIPTION OF PREFERRED EMBODIMENT

In a system for transmitting a dynamic image signal to a remote site such as a TV conference system or TV telephone system, the image signal is compressed and coded utilizing a line correlation or inter frame correlation of the video signal in order to efficiently utilize the transmission path.

The use of the line correlation allows to compress the image signal by implementing a DCT (discrete cosine transformation) process for example.

Figure 1:
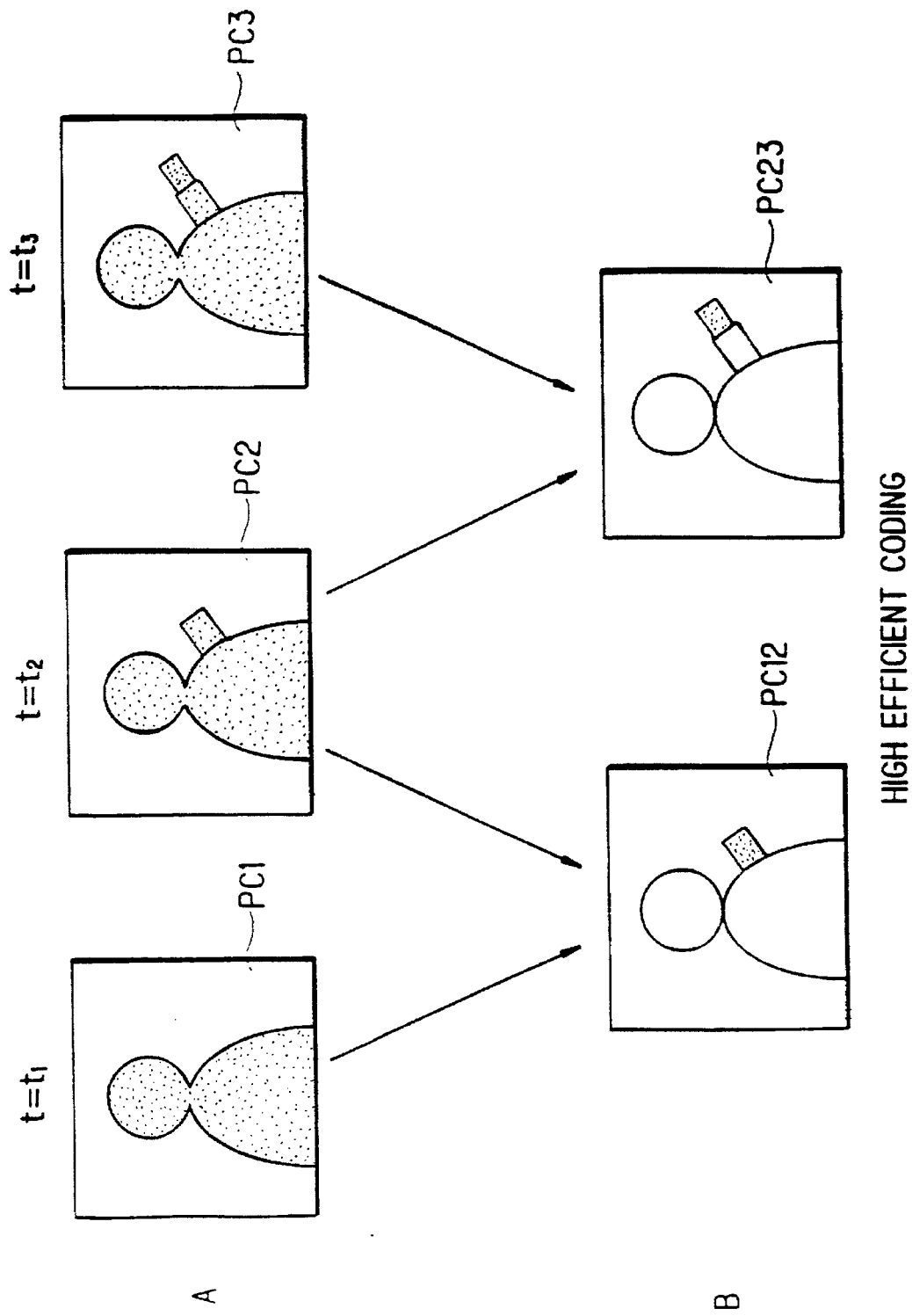
FIG. 1 is a drawing for explaining a principle of high efficient coding.

The use of the inter frame correlation allows to further compress and code the image signal. For example, as shown in FIG. 1, when frame images PC1, PC2 and PC3 are generated respectively at times t1, t2 and t3, a difference of the image signals of the frame images PC1 and PC2 is calculated to generate PC12 and a difference of the frame images PC2 and PC3 is calculated to generate PC23. Because images of neighboring frames normally do not have such a big change, a differential signal becomes small when a difference of the both is calculated. Then, a coding amount may be compressed by coding this differential signal.

However, the original image cannot be restored just by transmitting the differential signal. Then, the image in each frame is designated as either one picture among three pictures of I picture, P picture and B picture to compress and code the image signal.

Figure 2:
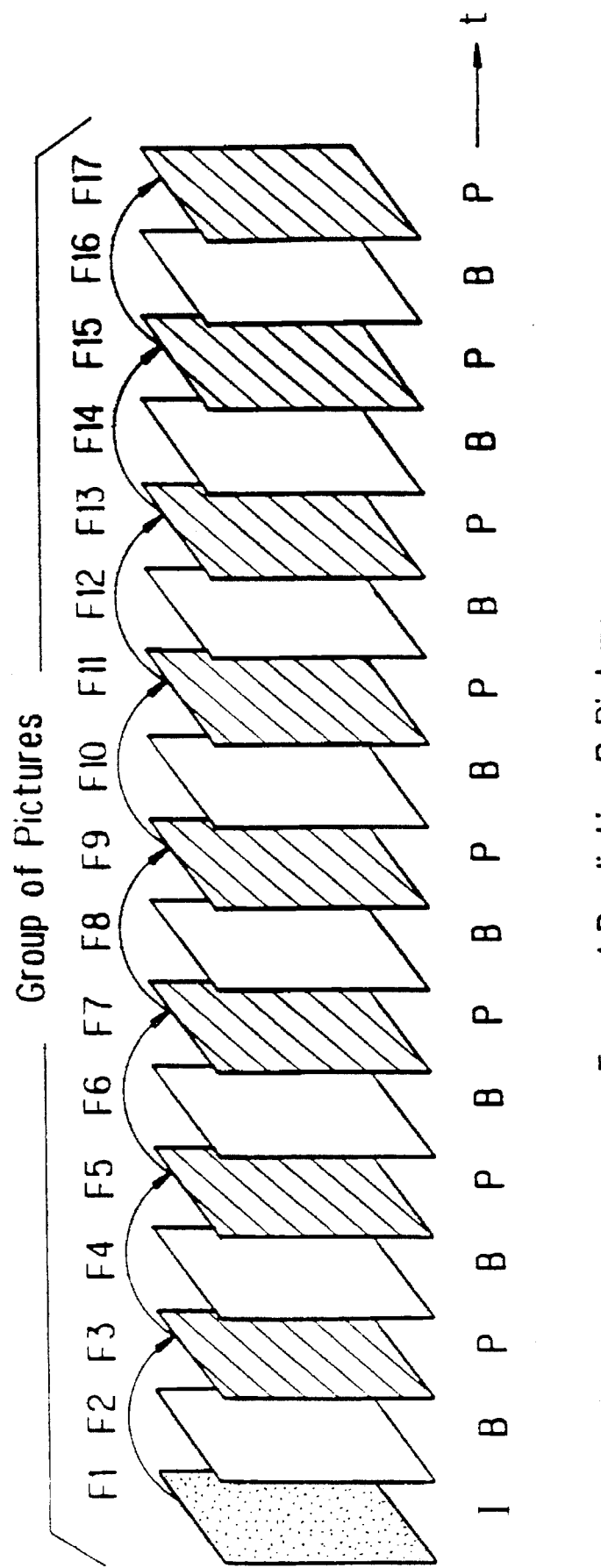
FIG. 2 is a drawing for explaining types of pictures in compressing image data.

That is, as shown in FIG. 2 for example, image signals of 17 frames from frame F1 through frame F17 are designated as a group of pictures as a unit of processing. Then, the image signal of the first frame F1 is coded as I picture, the second frame F2 is processed as B picture and the third frame F3 is processed as P picture, respectively. On and after the fourth frame F4 through the frame F17 are processed alternately as B picture or P picture.

Figure 3:
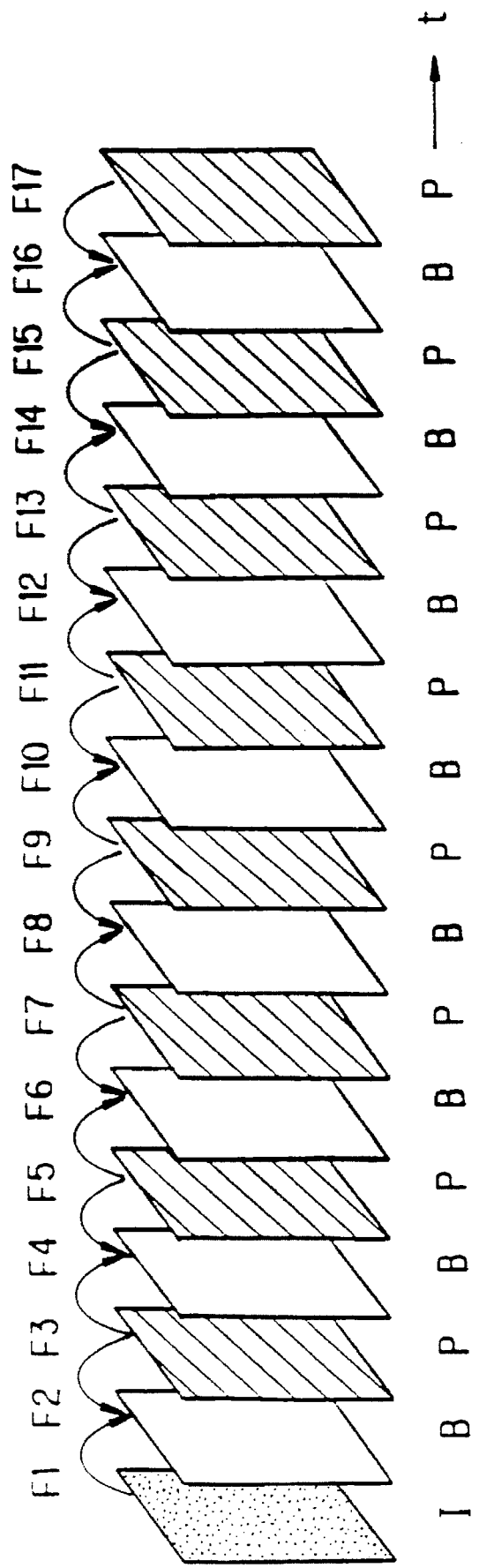
FIG. 3 is a drawing for explaining the types of pictures in compressing image data.

As the image signal of the I picture, the image signal of 1 frame is transmitted as it is. Contrary to that, as the image signal of the P picture, basically a difference from the image signal of the preceding I or P picture is transmitted as shown in FIG. 2. Further, as the image signal of the B picture, basically a difference from an average value of both of the preceding frame and succeeding frame is found and is coded as shown in FIG. 3.

Figure 4:
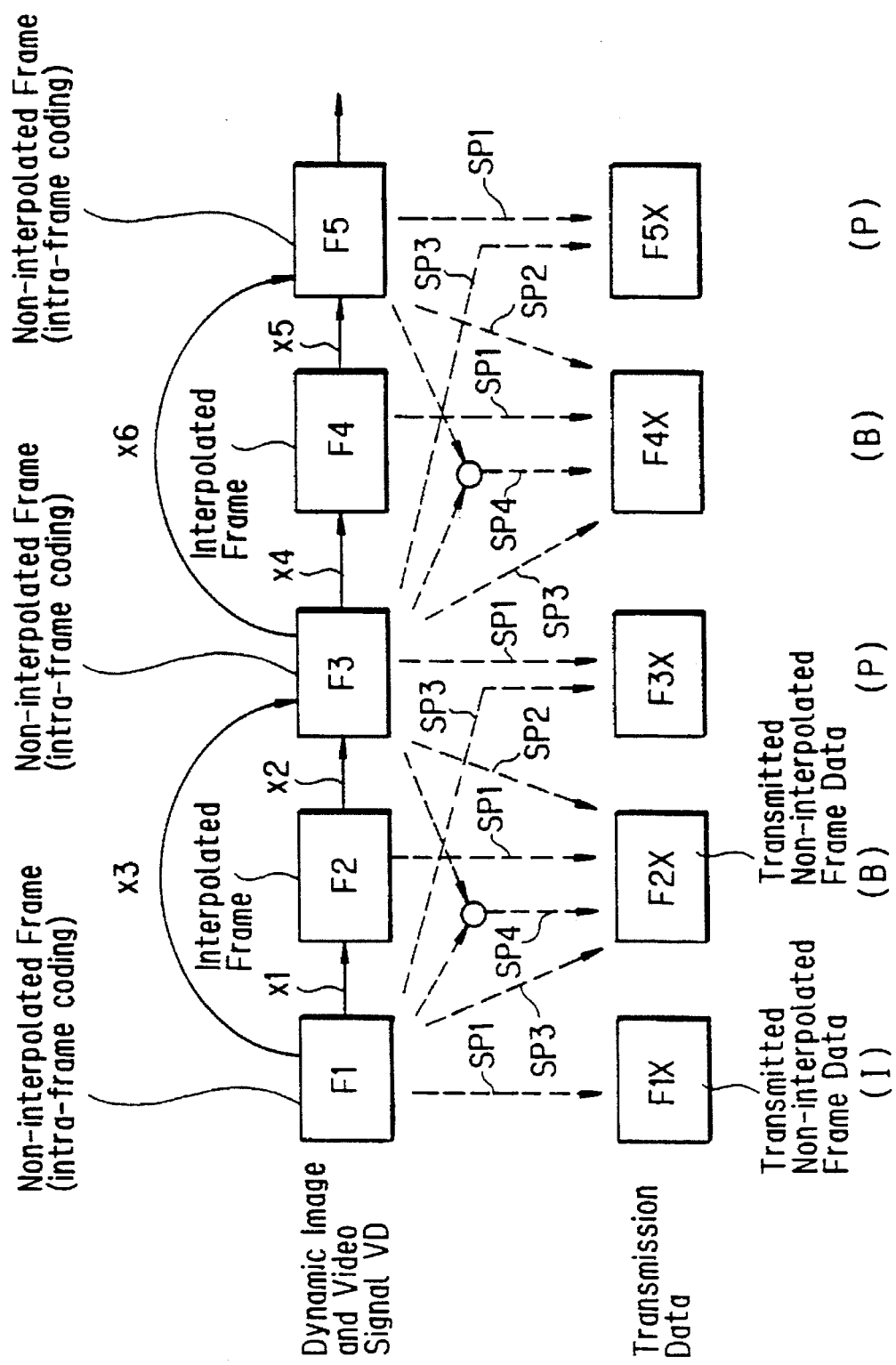
FIG. 4 is a diagram for explaining a principle for coding a dynamic image signal.

FIG. 4 shows a principle of a method for thus coding the dynamic image signal. As shown in the figure, because the first frame F1 is processed as I picture, it is transmitted onto the transmission path as it is as transmission data F1X (intra image coding). Contrary to that, because the second frame F2 is processes as B picture, the difference from the average value of the preceding frame F1 and succeeding frame F3 is calculated and is transmitted as transmission data F2X.

Explaining this process for B picture in more detail, there exist four kinds of processes. The first process is to transmit data of the original frame F2 as it is as the transmission data F2X (SP1) (intra coding), which is the same process with that of I picture. The second process is to calculate a difference from the succeeding frame F3 and to transmit the difference (SP2) (rearward predictive coding). The third process is to transmit a difference (SP3) from the preceding frame F1 (forward predictive coding). The fourth process is to produce a difference (SP4) from an average value of the preceding frame F1 and the succeeding frame F3 and to transmit it as the transmission data F2X (bi-directional predictive coding).

Among those four methods, one which minimizes the transmission data is adopted.

By the way, when the differential data is transmitted, a motion vector x1 (motion vector between the frames F1 and F2) between the image (prediction image) in the frame from which the difference is to be calculated (in the case of forward prediction), x2 (motion vector between the frames F3 and F2) (in the case of rearward prediction) or both x1 and x2 (in the case of bi-directional prediction) is transmitted together with the differential data.

For the frame F3 which is P picture, the differential signal (SP3) from the preceding frame F1 as a prediction image and a motion vector x3 are calculated and are transmitted as transmission data F3X (forward predictive coding). Or, the data of the original frame F3 is transmitted as it is as the data F3X (SP1) (intra coding). Either of the methods which lessens the transmission data is selected similarly to the case of B picture.

Figure 5:
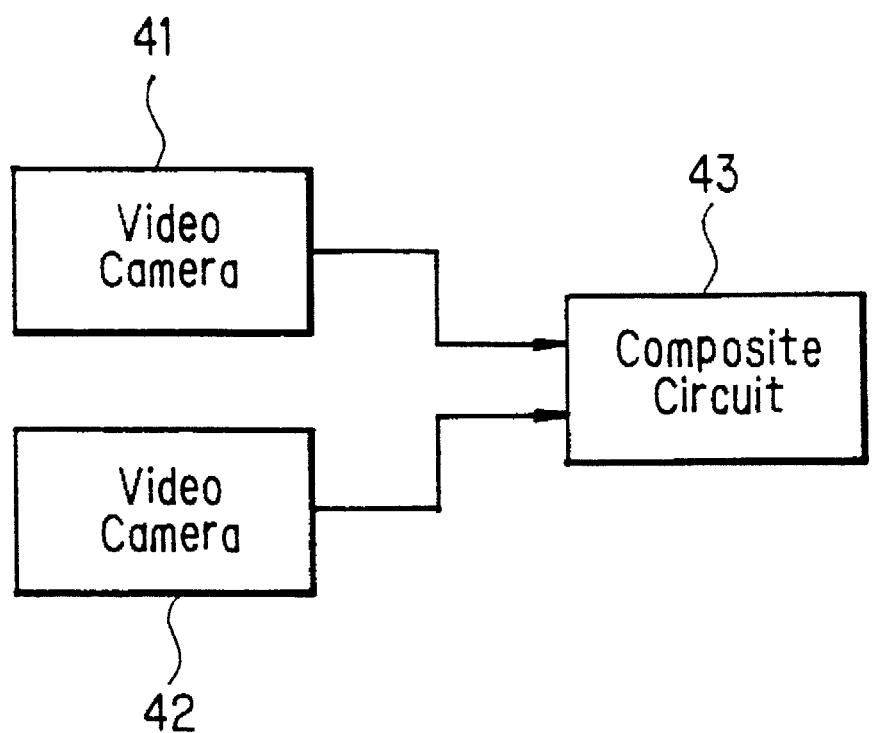
FIG. 5 is a block diagram showing an exemplary structure of a system for producing a stereoscopic video signal.
Figure 6:
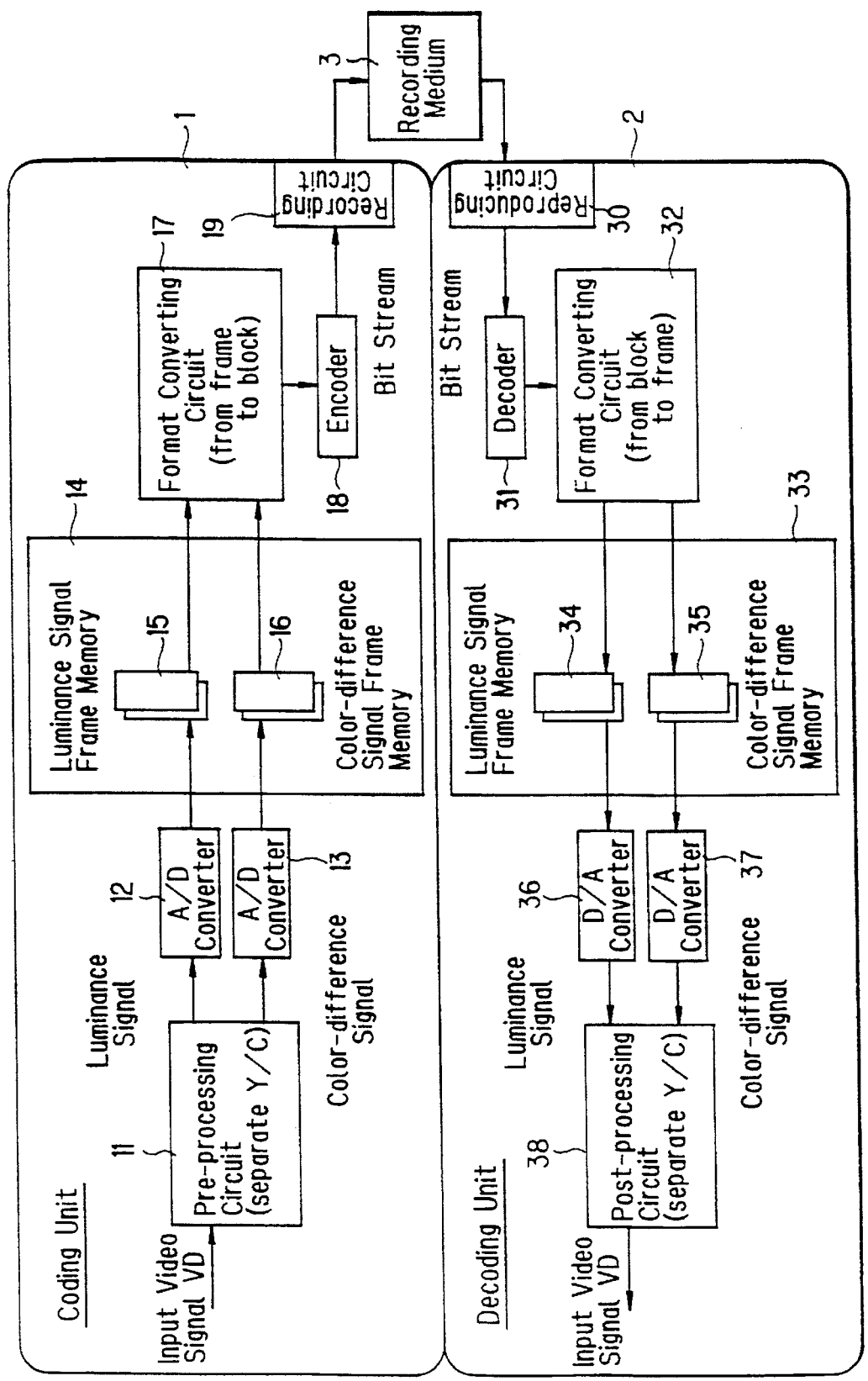
FIG. 6 is a block diagram showing an exemplary structure of an image coding unit and decoding unit.

FIGS. 5 and 6 show exemplary structures of units for coding, transmitting and decoding the stereoscopic dynamic image signal based on the principle described above. Video cameras 41 and 42 are disposed on the left and right corresponding to the parallax of left and right human eyes to shoot a certain object. Thereby, the video cameras 41 and 42 output video signals for left and right eyes, respectively. Those video signals are input to a composite circuit 43 to be composited. Thereby, the video signal for left eye is inserted to odd fields of the interlaced structure for example and the video signal for right eye is inserted to even fields, respectively. The composite circuit 43 thus composites the video signals in the odd and even fields having such interlaced structure and outputs to a coding unit 1 shown in FIG. 6.

The coding unit 1 codes the input video signal and transmits it to a recording medium 3 as a transmission path. Then, a decoding unit 2 reproduces, decodes and outputs the signal recorded in the recording medium 3.

In the coding unit 1, the input video signal is input to a pre-processing circuit 11 wherein a luminance signal and color signal (color-difference signal in the case of the present embodiment) are separated which are then converted from analog to digital respectively by A/D converters 12 and 13. The signals which have been converted from analog to digital by the A/D converters 12 and 13 and have become digital signals are supplied to a frame memory 14 to be stored. The frame memory 14 stores the luminance signal to a luminance signal frame memory 15 and the color-difference signal to a color-difference signal frame memory 16, respectively.

Figure 7:
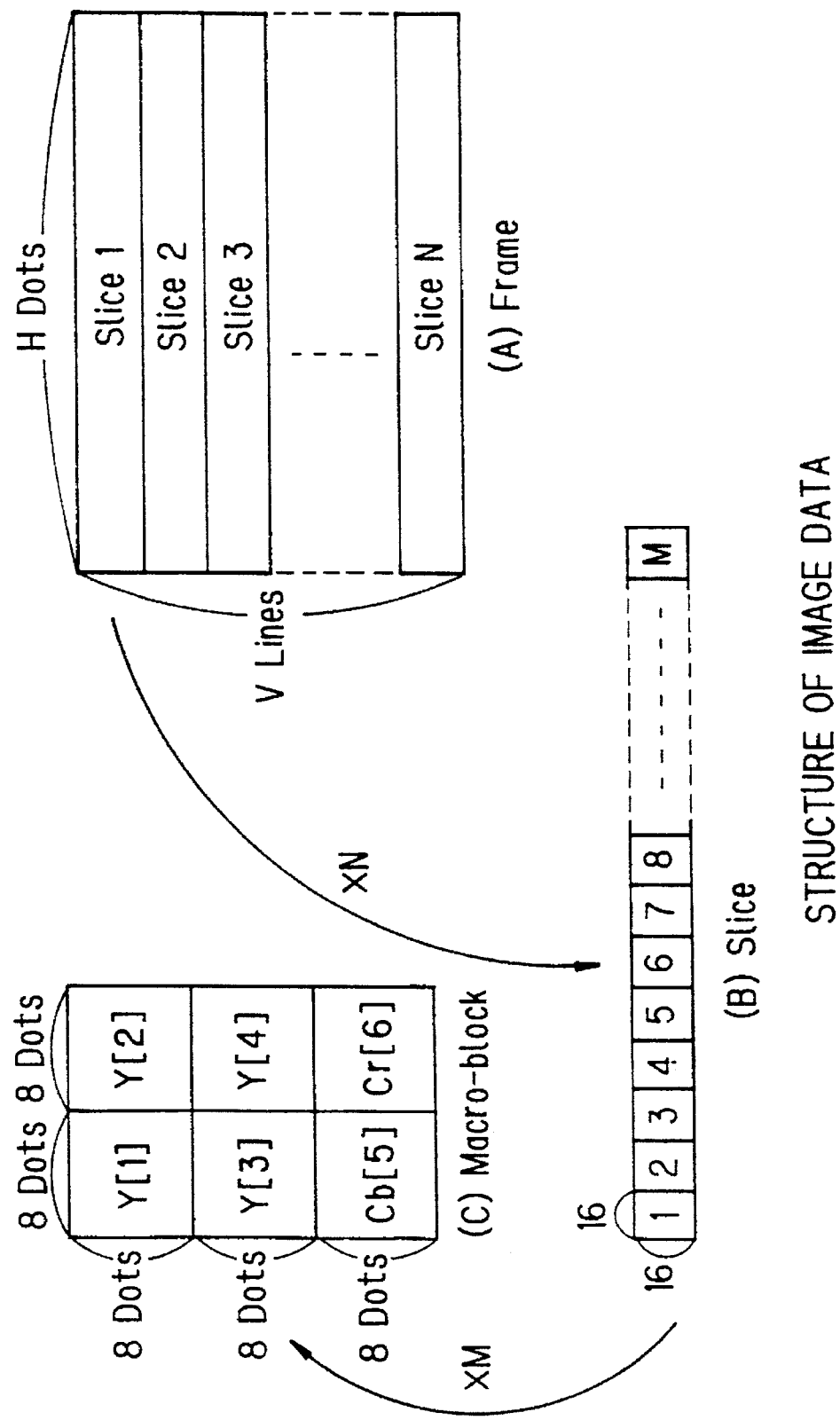
FIG. 7 is a diagram for explaining a format converting operation of a format converting circuit 17 in FIG. 6.

A format converting circuit 17 converts the frame format signals stored in the frame memory 14 into block format signals. That is, as shown in FIG. 7, the video signal stored in the frame memory 14 is frame format data in which lines of H dots per line are assembled by V. The format converting circuit 17 divides this one frame of signal into M slices with a unit of 16 lines. Then, each slice is subdivided into M macro-blocks. Each macro-block is composed of luminance signals which correspond to 16×16 pixels (dots) and this luminance signal is subdivided further into blocks Y[1] through Y[4] with a unit of 8×8 dots. Then, a 8×8 dot Cb signal and 8×8 dot Cr signal are caused to correspond to this 16×16 dot luminance signal.

The data thus converted into the block format is supplied from the format converting circuit 17 to an encoder 18 to be encoded. Its detail will be described later with reference to FIG. 8.

The signal encoded by the encoder 18 is output to the transmission path as a bit stream. It is supplied to a recording circuit 19 for example and is recorded in the recording medium 3 as a digital signal.

The data reproduced from the recording medium 3 by a reproducing circuit 30 is supplied to a decoder 31 in the decoding unit 2 to be decoded. The detail of the decoder 31 will be explained later with reference to FIG. 13.

The data decoded by the decoder 31 is input to a format converting circuit 32 to be converted from the block format to the frame format. Then, the frame format luminance signal is supplied to and stored in a luminance signal frame memory 34 in a frame memory 33 and the color-difference signal is supplied to and stored in a color-difference signal frame memory 35. The luminance signal and color-difference signal read out of the luminance signal frame memory 34 and color-difference signal frame memory 35 are converted from digital to analog respectively by D/A converters 36 and 37 and are supplied to and combined in a post-processing circuit 38. Then, it is output to and displayed on a display such as a CRT, which will be described later with reference to FIG. 20.

Next, the exemplary structure of the encoder 18 will be explained with reference to FIG. 8. The image data to be coded is input to a motion vector detecting circuit 50 with the unit of macro-block. The motion vector detecting circuit 50 processes the image data in each frame as I picture, P picture or B picture following to a predetermined sequence. How to process the image in each frame sequentially input as either I, P or B picture is determined beforehand (for example, the group of pictures composed of the frames F1 through F17 is processed as I, B, P, B, P, . . . B, P as shown in FIGS. 2 and 3).

Image data in a frame (e.g., frame F1) to be processed as I picture is transferred to and stored in a forward original image section 51a of a frame memory 51 from the motion vector detecting circuit 50, image data in a frame (e.g., frame F2) to be processed as B picture is transferred to and stored in an original image section 51b and image data in a frame (e.g., frame F3) to be processed as P picture is transferred to and stored in a rearward original image section 51c.

In the next timing, when an image in a frame to be processed as B picture (frame F4) or P picture (frame F5) is input further, the image data of the first P picture (frame F3)

which has been stored in the rearward original image section 51c is transferred to the forward original image section 51a, the image data of the next B picture (frame F4) is stored (overwritten) in the original image section 51b and the image data of the next P picture (frame F5) is stored (overwritten) in the rearward original image section 51c. This kind of operation is sequentially repeated.

The signal of each picture stored in the frame memory 51 is read out of it and is processed in a frame prediction mode or field prediction mode in a prediction mode switching circuit 52. That is, the video signal in which the image for left eye and image for right eye are respectively disposed in the odd and even fields is processed adaptively with the unit of field or frame, not processing always with the unit of frame like the prior art technology.

Further, in an operating section 53, an operation for the intra-image prediction, forward prediction, rearward prediction or bi-directional prediction is carried out under the control of a prediction determining circuit 54. Which process is to be carried out among those processes is determined corresponding to a prediction error signal (a difference between a reference image to be processed and a prediction image). In order for that, the motion vector detecting circuit 50 produces an absolute sum (or square sum) of the prediction error signal used for this determination.

Now the frame prediction mode and field prediction mode in the prediction mode switching circuit 52 will be explained.

Figure 9:
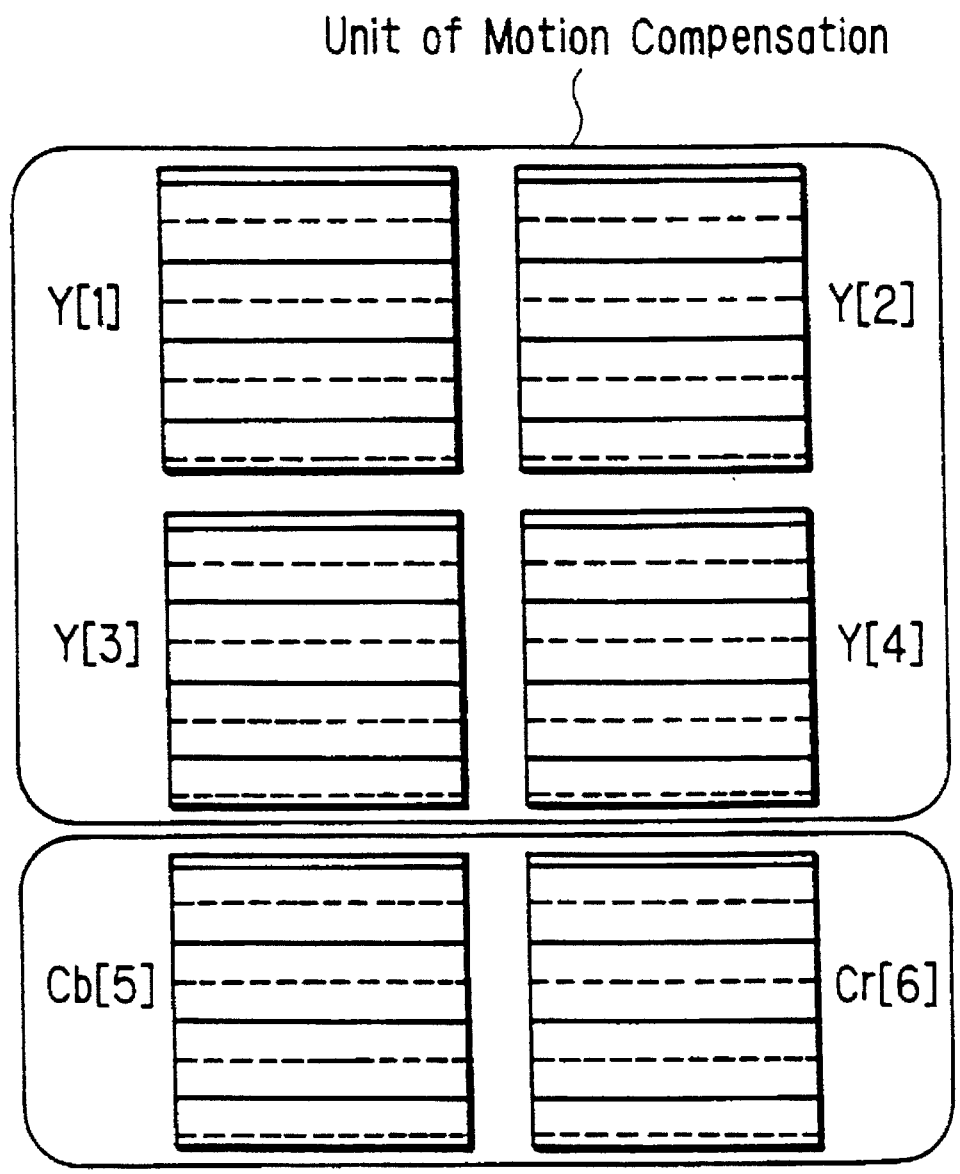
FIG. 9 is a diagram for explaining an operation of a prediction mode switching circuit 52.

When the frame prediction mode is set, the prediction mode switching circuit 52 outputs four luminance blocks Y[1] through Y[4] supplied from the motion vector detecting circuit 50 as it is to the rear operating section 53. That is, in this case, data in the odd field lines and data in the even field lines are mixed in each luminance block as shown in FIG. 9. In the frame prediction mode, the prediction is made with the unit of four luminance blocks (macro-block) and one motion vector corresponds to four luminance blocks.

Figure 10:
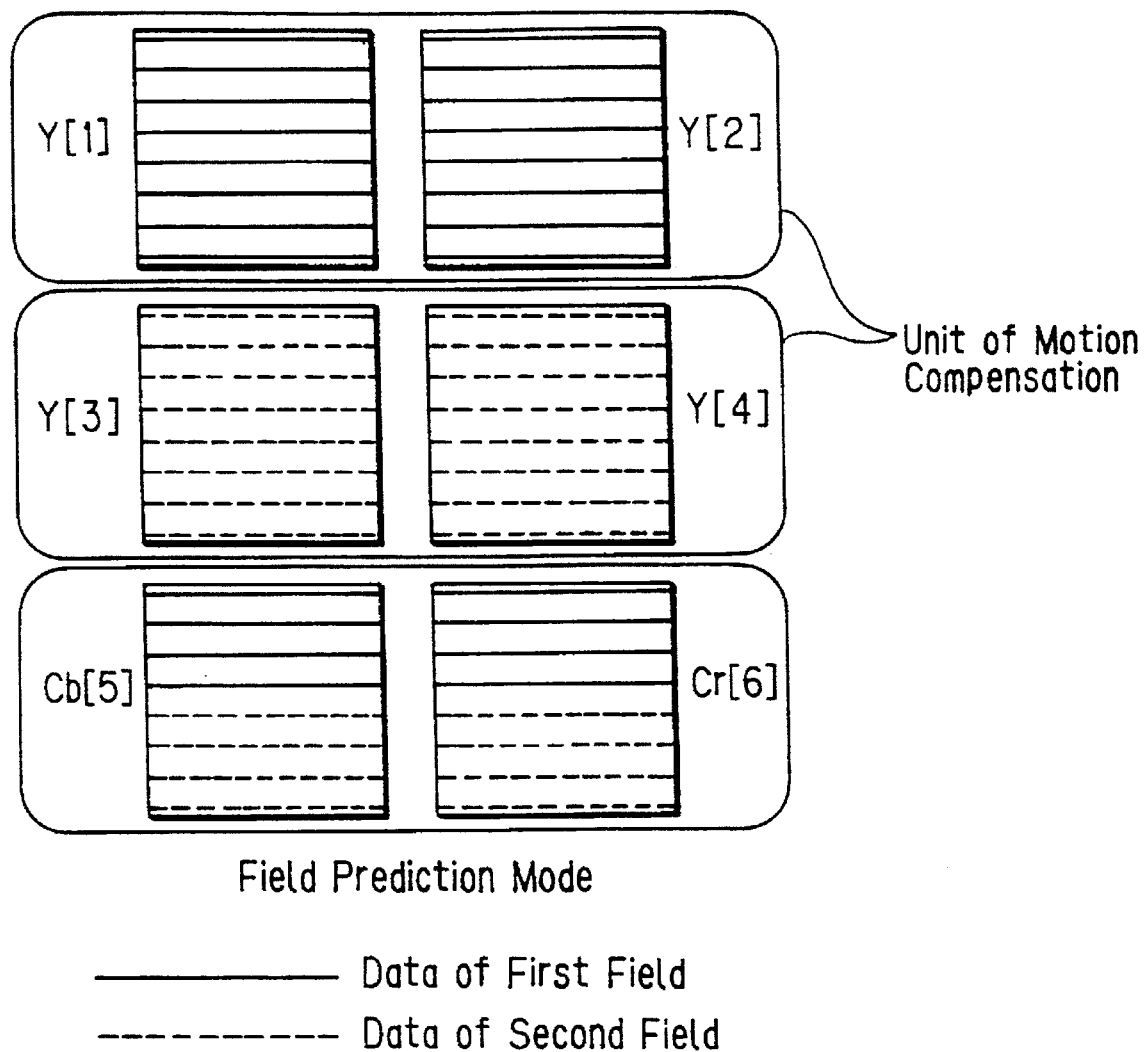
FIG. 10 is a diagram for explaining an operation of the prediction mode switching circuit 52.

Contrary to that, in the field prediction mode, the prediction mode switching circuit 52 outputs the signal input from the motion vector detecting circuit 50 with the composition shown in FIG. 9 to the operating section 53 by composing the luminance blocks Y[1] and Y[2] among the four luminance blocks only by dots of the odd field (image for left eye) lines for example as shown in FIG. 10 and composing the other two luminance blocks Y[3] and Y[4] by data of the even field (image for right eye) lines. In this case, one motion vector corresponds to the two luminance blocks Y[1] and Y[2] and the other one motion vector corresponds to the other two luminance blocks Y[3] and Y[4]. That is, the image for right eye and the image for left eye are separately processed in the field prediction mode.

The motion vector detecting circuit 50 outputs the absolute sum of the prediction error in the frame prediction mode and that in the field prediction mode to the prediction mode switching circuit 52. The prediction mode switching circuit 52 compares the absolute sums of the prediction errors in the frame prediction mode and in the field prediction mode, implements a processing which corresponds to either prediction mode whose value is smaller and outputs the data to the operating section 53.

However, such processing is carried out actually in the motion vector detecting circuit 50. That is, the motion vector detecting circuit 50 outputs a signal having a composition corresponding to a determined mode to the prediction mode switching circuit 52 which outputs the signal as it is to the rear operating section 53.

By the way, the color-difference signal is supplied to the operating section 53 in the state in which the odd field (image for left eye) line data and even field (image for right eye) line data are mixed as shown in FIG. 9 in the case of the frame prediction mode. In the case of the field prediction mode however, the upper half portion (4 lines) of each color-difference block Cb and Cr is occupied by the color-difference signal in the odd fields (image for left eye) which correspond to the luminance blocks Y[1] and Y[2] and the lower half portion (4 lines) is occupied by the color-difference signal in the even fields (image for right eye) which correspond to the luminance blocks Y[3] and Y[4] as shown in FIG. 10.

The motion vector detecting circuit 50 produces the absolute sum of the prediction error for determining which prediction of the intra-image prediction, forward prediction, rearward prediction or bi-directional prediction is to be carried out in the prediction determining circuit 54, as follows.

That is, as the absolute sum of the prediction error of the intra-image prediction, it finds a difference of an absolute value $|\text{sigma } A_{ij}|$ of a sum sigma $A_{ij}$ of signals $A_{ij}$ in the macro-block of the reference image and a sum sigma $|A_{ij}|$ of the absolute value $|A_{ij}|$ of the signal $A_{ij}$ in the macro-block. Further, as the absolute sum of the prediction error of the forward prediction, it finds a sum sigma $|A_{ij}-B_{ij}|$ of an absolute value $|A_{ij}-B_{ij}|$ of a difference $A_{ij}-B_{ij}$ of the signal $A_{ij}$ in the macro-block of the reference image and a signal $B_{ij}$ in the macro-block of the prediction image. The absolute value of the prediction error of the rearward prediction and bi-directional prediction is also found in the same manner with the case of the forward prediction (by changing the prediction image to a prediction image different from that in the forward prediction).

These absolute sums are supplied to the prediction determining circuit 54. The prediction determining circuit 54 selects the smallest absolute sum among the absolute sums of the prediction error of the forward prediction, rearward prediction and bi-directional prediction as the absolute sum of the prediction error of inter prediction. It then compares the absolute value of the prediction error of the inter prediction with that of the intra-image prediction and selects one whose value is smaller to select a mode which corresponds to the selected absolute sum as a prediction mode. That is, if the absolute sum of the prediction error of the intra-image prediction is smaller, the intra-image prediction mode is set. However, if the absolute sum of the prediction error of the inter prediction is smaller, a mode whose corresponding absolute sum is the smallest is selected among the forward prediction, rearward prediction and bi-directional prediction.

Thus, the motion vector detecting circuit 50 supplies the signal in the macro-block of the reference image with the composition which corresponds to the mode selected by the prediction mode switching circuit 52 among the frame or field prediction mode to the operating section 53 via the prediction mode switching circuit 52 and detects a motion vector between a prediction image which corresponds to the prediction mode selected by the prediction determining circuit 54 among the four prediction modes and the reference image to output to a variable length coding circuit 58 and motion compensating circuit 65. As described above, for this motion vector, one whose corresponding absolute sum of the prediction error is smallest is selected.

When the motion vector detecting circuit 50 reads the image data of I picture from the forward original image section 51a, the prediction determining circuit 54 sets the frame mode or intra-field (image) prediction mode (a mode in which no motion is compensated) as a prediction mode and switches a switch 53d in the operating section 53 to the side of a contact (a). Thereby, the image data of I picture is input to a DCT mode switching circuit 55.

Figure 11:
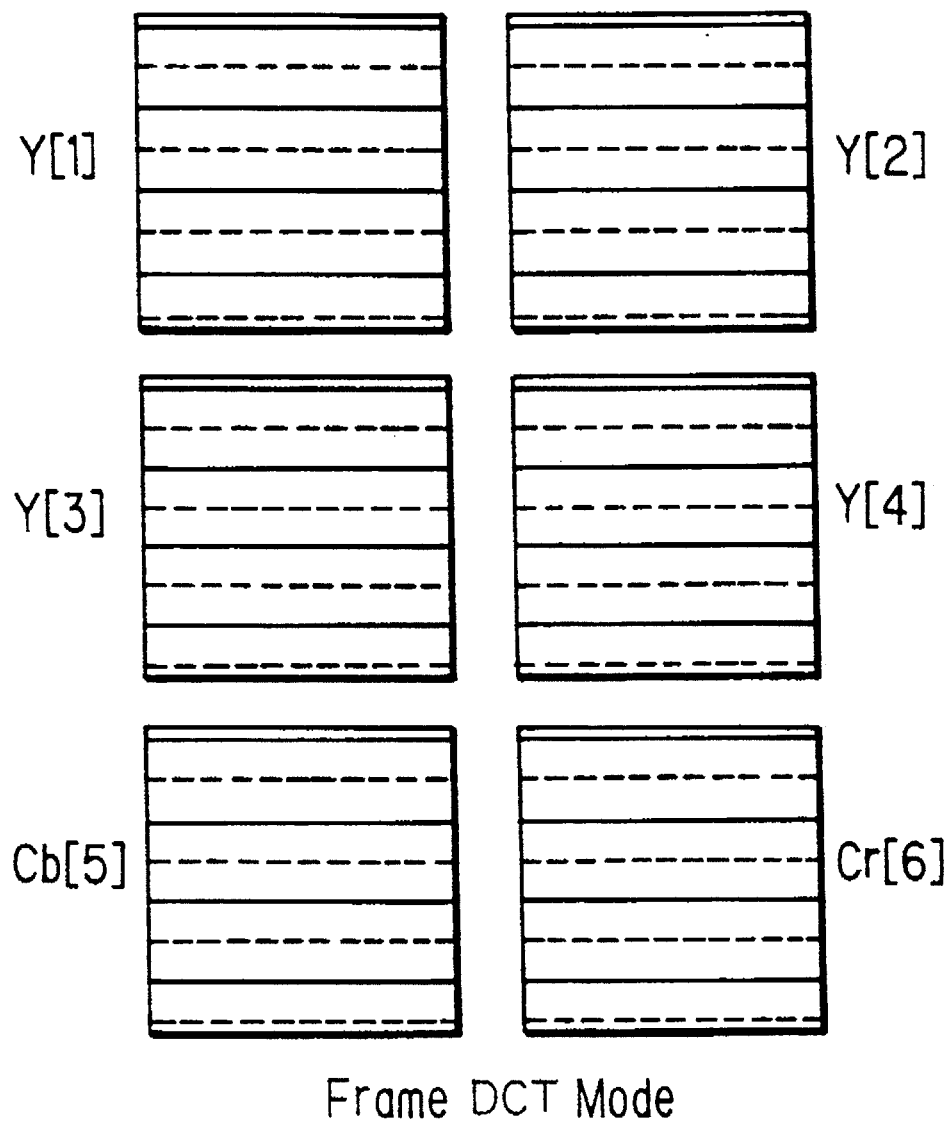
FIG. 11 is a diagram for explaining an operation of a DCT mode switching circuit 52.
Figure 12:
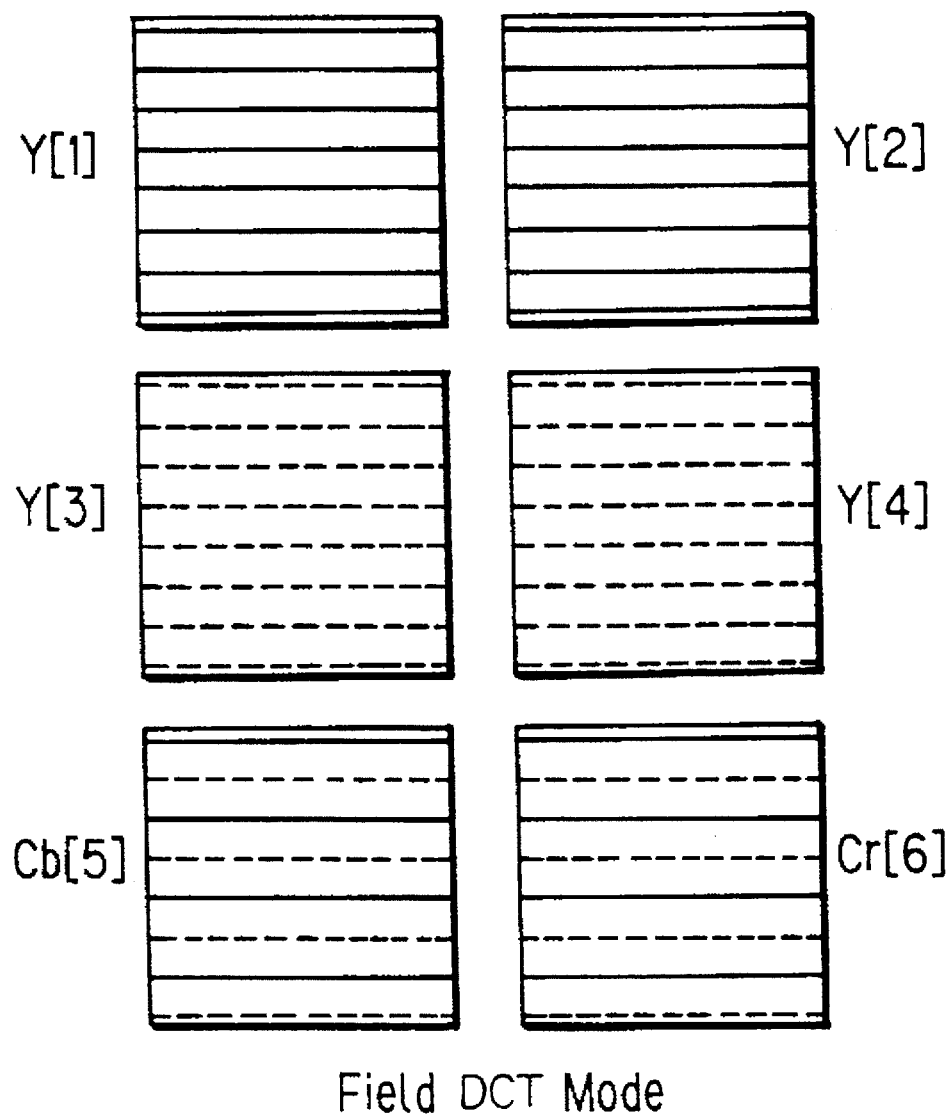
FIG. 12 is a diagram for explaining an operation of the DCT mode switching circuit 52.

As shown in FIG. 11 or 12, this DCT mode switching circuit 55 outputs to a DCT circuit 56 the data of four luminance blocks in a state in which the odd field (image for left eye) lines and even field (image for right eye) lines are mixed (frame DCT mode) or in a state in which they are separated (field DCT mode).

That is, the DCT mode switching circuit 55 compares a coding efficiency when DCT processing is implemented in the state in which the data in the odd fields (image for left eye) and the even fields (image for right eye) are mixed and that when DCT processing is implemented in the state in which they are separated to select a mode having a better coding efficiency. In the case of the field DCT mode, the image for right eye and the image for left eye are separetely processed.

For example, it composes the input signal in the manner as shown in FIG. 11 in which the odd field (image for left eye) lines and even field (image for right eye) line are mixed, calculates a difference of the signals in the vertically neighboring odd field (image for left eye) line and the even field (image for right eye) line and finds its sum (or square sum) of absolute values.

Or, it composes the input signal in the manner as shown in FIG. 12 in which the odd field (image for left eye) and even field (image for right eye) lines are separated, calculates a difference of signals between vertically neighboring odd field (image for left eye) lines and a difference of signals between even field (image for right eye) lines and finds a sum (or square sum) of respective absolute values.

Further, it compares the both (absolute sums) and sets a DCT mode which corresponds to the smaller value. That is, if the former is smaller, it sets the frame DCT mode and if the latter is smaller, sets the field DCT mode.

It then outputs data in a composition which corresponds to a selected DCT mode to the DCT circuit 56 and outputs a DCT flag indicating the selected DCT mode to the variable length coding circuit 58, a DCT block reordering circuit 62 and the motion compensating circuit 65.

As it is apparent when the prediction mode in the prediction mode switching circuit 52 (FIGS. 9 and 10) and the DCT mode in the DCT mode switching circuit 55 (FIGS. 11 and 12) are compared, the data structure of the both in each mode is substantially the same concerning to the luminance blocks.

When the frame prediction mode (the mode in which the odd lines (image for left eye) and even lines (image for right eye) are mixed) is selected in the prediction mode switching circuit 52, the frame DCT mode (the mode in which the odd lines (image for left eye) and even lines (image for right eye) are mixed) is likely to be selected also in the DCT mode switching circuit 55 and when the field prediction mode (the mode in which data in the odd fields (image for left eye) and even fields (image for right eye) are separated) is selected in the prediction mode switching circuit 52, the field DCT mode (the mode in which data in the odd fields (image for left eye) and even fields (image for right eye) are separate) is likely to be selected also in the DCT mode switching circuit 55.

However, it is not always the case and the prediction mode switching circuit 52 decides the mode so that the absolute sum of the prediction error becomes small and the DCT mode switching circuit 55 decides the mode so that the coding efficiency becomes better.

The image data of I picture output from the DCT mode switching circuit 55 is input to the DCT circuit 56 to undergo a DCT (discrete cosine transformation) process to be converted into DCT coefficient. This DCT coefficient is input to a quantization circuit 57 to be quantized by quantization steps which correspond to a data storage amount (buffer storage amount) in a transmission buffer 59 and is then input to the variable length coding circuit 58.

The variable length coding circuit 58 converts the image data supplied from the quantization circuit 57 (the data of I picture in this case) into variable length codes such as Huffman code corresponding to the quantization steps (scale) supplied from the quantization circuit 57 and outputs it to the transmission buffer 59.

The quantization steps (scale) from the quantization circuit 57, prediction mode (indicating which of the intra-image prediction, forward prediction, rearward prediction or bi-directional prediction is set) from the prediction determining circuit 54, motion vector from the motion vector detecting circuit 50, prediction flag (indicating which of the frame prediction mode or field prediction mode is set) from the prediction mode switching circuit 52 and DCT flag (indicating which of the frame DCT mode or field DCT mode is set) output from the DCT mode switching circuit 55 are input to the variable length coding circuit 58 and they are also variable length coded.

The transmission buffer 59 temporarily stores the input data and outputs the data corresponding to the storage amount to the quantization circuit 57. When the data residual amount in the transmission buffer 59 increases up to the allowable upper limit value, the transmission buffer 59 lowers a data amount of quantized data by increasing the quantization scale of the quantization circuit 57 by a quantization control signal. When the data residual amount reduces to the allowable lower limit value contrary to that, the transmission buffer 59 increases the data amount of the quantized data by reducing the quantization scale of the quantization circuit 57 by the quantization control signal. Thus an overflow or underflow of the transmission buffer 59 is prevented.

The data stored in the transmission buffer 59 is then read out with a predetermined timing, is added a parity for ECC, is modulated for example by EFM and is recorded in the recording medium (disk 68).

On the other hand, the data of I picture output from the quantization circuit 57 is input to an inverse quantization circuit 60 and is inversely quantized corresponding to the quantization steps supplied from the quantization circuit 57. The output of the inverse quantization circuit 60 is input to an IDCT (inverse DCT) circuit 61 to undergo an inverse DCT process and is input to the DCT block reordering circuit 62. The DCT block reordering circuit 62 reorders the input data corresponding to the prediction flag supplied from the prediction mode switching circuit 52 and the DCT flag supplied from the DCT mode switching circuit 55.

That is, when the frame prediction mode is set in the prediction mode switching circuit 52, the data read out of the motion compensating circuit 65 and is supplied to the operating section 53 is in the state in which the data of the odd fields (image for left eye) and even fields (image for right eye) are mixed. This data is supplied also to an operator 63. Due to that, while the DCT block reordering circuit 62 outputs the data supplied from the IDCT circuit 61 to the operator 63 as it is when the frame DCT mode is set, it reorders the data when the field DCT mode is set so that the data in the odd fields (image for left eye) and even fields (image for right eye) are mixed, because they are being separated, and outputs them to the operator 63.

On the other hand, when the field prediction mode is set in the prediction mode switching circuit 52, the data supplied from the motion compensating circuit 65 to the operating section 53 is in the state in which the data in the odd fields (image for left eye) and even fields (image for right eye) are separated. Due to that, while the DCT block reordering circuit 62 supplies the data output from the IDCT circuit 61 to the operator 63 as it is when the field DCT mode is set by the DCT mode switching circuit 55, it reorders the data when the frame DCT mode is set so that the data in the odd fields (image for left eye) and even fields (image for right eye) are separated, because they are being mixed, and outputs them to the operator 63.

That is, the DCT block reordering circuit 62 reorders the data output by the IDCT circuit 61 so that it is ordered in the same manner with the order of the data supplied from the motion compensating circuit 65 to the operating section 53.

In this case, because the data output from the IDCT circuit 61 is I picture data, the intra-image prediction is designated. Due to that, when the DCT mode switching circuit 55 outputs the frame DCT flag, the data output from the IDCT circuit 61 is supplied to and stored in a forward prediction image section 64a in a frame memory 64 as it is via the operator 63. When the field DCT flag is output, it is reordered and is then stored.

When the motion vector detecting circuit 50 processes image data in each frame sequentially input respectively as I, B, P, B, P, B ... picture for example, it processes, after processing image data in the first input frame as I picture and before processing image data in the next input frame as B picture, image data in the input frame after next as P picture, because decoding cannot be made if P picture as the rearward prediction image is not prepared beforehand since B picture involves a rearward prediction.

Therefore, the motion vector detecting circuit 50 starts to process the image data in P picture stored in the rearward original image section 51c after processing I picture. Then, the absolute sum of the inter-frame difference (prediction error) with the unit of macro-block is supplied from the motion vector detecting circuit 50 to the prediction mode switching circuit 52 and prediction determining circuit 54 in the same manner as described above. Corresponding to the absolute sum of the prediction error in the macro-block of this P picture, the prediction mode switching circuit 52 and the prediction determining circuit 54 set the intra-image prediction mode, forward prediction mode, rearward prediction mode or bi-directional prediction mode.

When the intra-image prediction mode is set, the operating section 53 switches the switch 53d to the side of contact (a) as described above. Accordingly, this data is transmitted to the transmission path via the DCT mode switching circuit 55, DCT circuit 56, quantization circuit 57, variable length coding circuit 58 and transmission buffer 59 in the same manner with the I picture data. This data is also supplied to and stored in a rearward prediction image section 64b in the frame memory 64 via the inverse quantization circuit 60, IDCT circuit 61, DCT block reordering circuit 62 and operator 63.

When the forward prediction mode is set, the switch 53d is switched to a contact (b) and the image (I picture in this case) data stored in the forward prediction image section 64a in the frame memory 64 is read and is motion compensated by the motion compensating circuit 65 corresponding to a motion vector output by the motion vector detecting circuit 50. That is, when the prediction determining circuit 54 commands to set the forward prediction mode, the motion compensating circuit 65 reads out the data by shifting a read address in the forward prediction image section 64a from a position corresponding to a position in the macro-block which the motion vector detecting circuit 50 now outputs by a degree which corresponds to the motion vector to produce prediction image data.

The prediction image data output from the motion compensating circuit 65 is supplied to an operator 53a. The operator 53a subtracts from the data of macro-block of the reference image supplied from the prediction mode switching circuit 52 the prediction image data supplied from the motion compensating circuit 65 and which corresponds to the macro-block and outputs its difference (prediction error). This differential data is transmitted to the transmission path via the DCT mode switching circuit 55, DCT circuit 56, quantization circuit 57, variable length coding circuit 58 and transmission buffer 59. This differential data is also locally decoded by the inverse quantization circuit 60, IDCT circuit 61 and DCT block reordering circuit 62 and is then input to the operator 63.

The operator 63 is supplied also with data which is same with the prediction image data supplied to the operator 53a. The operator 63 adds the prediction image data output by the motion compensating circuit 65 to the differential data which the DCT block reordering circuit 62 outputs. Thereby, the original (decoded) P picture image data can be obtained. The P picture image data is supplied to and stored in the rearward prediction image section 64b in the frame memory 64.

The motion vector detecting circuit 50 then executes the processing of B picture after storing the I and P picture data in the forward prediction image section 64a and the rearward prediction image section 64b. The prediction mode switching circuit 52 and the prediction determining circuit 54 set the frame/field mode corresponding to the value of the absolute sum of the inter-frame difference in the unit of macro-block and set either intra-image prediction mode, forward prediction mode, rearward prediction mode or bi-directional prediction mode.

As described above, when the intra-image prediction mode or forward prediction mode is set, the switch 53d is switched to the contact (a) or (b). At this time, the same processing as in the case of P picture is carried out and the data is transmitted.

Contrary to that, when the rearward prediction mode or bi-directional prediction mode is set, the switch 53d is switched to a contact (c) or (d).

During the rearward prediction mode in which the switch 53d is switched to the contact (c), the image (P picture in this case) data stored in the rearward prediction image section 64b is read and is motion compensated by the motion compensating circuit 65 corresponding to a motion vector output by the motion vector detecting circuit 50. That is, when the prediction determining circuit 54 commands to set the rearward prediction mode, the motion compensating circuit 65 reads out the data by shifting a read address in the rearward prediction image section 64b from a position corresponding to a position in the macro-block which the motion vector detecting circuit 50 now outputs by a degree which corresponds to the motion vector to produce prediction image data.

The prediction image data output from the motion compensating circuit 65 is supplied to an operator 53b. The operator 53b subtracts the prediction image data supplied from the motion compensating circuit 65 from the data of macro-block of the reference image supplied from the prediction mode switching circuit 52 and outputs its difference. This differential data is transmitted to the transmission path via the DCT mode switching circuit 55, DCT circuit 56, quantization circuit 57, variable length coding circuit 58 and transmission buffer 59.

During the bi-directional prediction mode in which the switch 53d is switched to the contact (d), the image (image of I picture in this case) data stored in the forward prediction image section 64a and the image (image of P picture in this case) data stored in the rearward prediction image section 64b are read and are motion compensated by the motion compensating circuit 65 corresponding to the motion vector output by the motion vector detecting circuit 50.

That is, when the prediction determining circuit 54 commands to set the bi-directional prediction mode, the motion compensating circuit 65 reads out the data by shifting read addresses in the forward prediction image section 64a and rearward prediction image section 64b from a position corresponding to a position in the macro-block which the motion vector detecting circuit 50 now outputs by a degree which corresponds to the motion vectors (in this case, there are two motion vectors for forward prediction image and rearward prediction image) to produce prediction image data.

The prediction image data output from the motion compensating circuit 65 is supplied to an operator 53c. The operator 53c subtracts an average value of prediction image data supplied from the motion compensating circuit 65 from the data of macro-block of the reference image supplied from the motion vector detecting circuit 50 and outputs its difference. This differential data is transmitted to the transmission path via the DCT mode switching circuit 55, DCT circuit 56, quantization circuit 57, variable length coding circuit 58 and transmission buffer 59.

Because the image of B picture does not become a prediction image of another image, it is not stored in the frame memory 64.

By the way, the banks of the forward prediction image section 64a and the rearward prediction image section 64b in the frame memory 64 may be switched as necessary and one stored in one or the other bank as against a predetermined reference image may be output as a forward prediction image or rearward prediction image.

While the above explanation has been made centering on the luminance blocks, color-difference blocks are also processed and transmitted in the same manner with the unit of macro-blocks shown in FIGS. 9 through 12. By the way, for a motion vector in processing the color-difference blocks, one which is cut into a half of the motion vector of the corresponding luminance block respectively in the vertical and horizontal directions is used.

Figure 13:
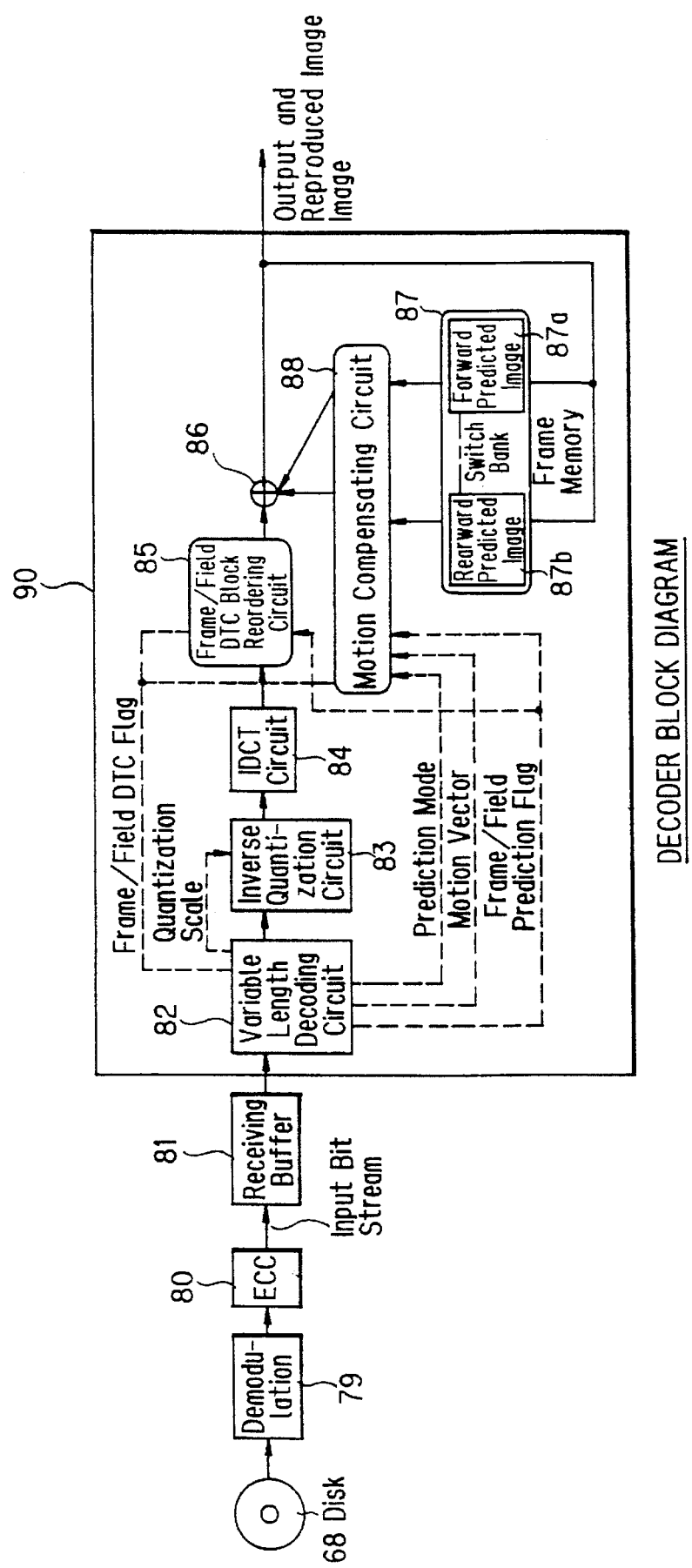
FIG. 13 is a block diagram showing an exemplary structure of a decoder 31 in FIG. 6.

FIG. 13 is a block diagram showing a structure of one embodiment of a decoder 31 in FIG. 6. The reproduced data read out of the disk 68 undergoes an EFM demodulation and ECC processing for example and is supplied to a receiving buffer 81 as coded data. The coded data is temporarily stored in the receiving buffer 81 in the decoder and is then supplied to a variable length decoding circuit 82 in a decoding circuit 90. The variable length decoding circuit 82 variable length decodes the data supplied from the receiving buffer 81 and outputs the motion vector, prediction mode, prediction flag and DCT flag to a motion compensating circuit 88. It also outputs the quantization steps (scale) and the decoded image data to an inverse quantization circuit 83. It also outputs the DCT flag and prediction flag to a DCT block reordering circuit 85.

The inverse quantization circuit 83 inversely quantizes the image data supplied from the variable length decoding circuit 82 in accordance to the quantization steps similarly supplied from the variable length decoding circuit 82 and outputs it to an IDCT circuit 84. The data (DCT coefficient) output from the inverse quantization circuit 83 undergoes an inverse DCT processing in the IDCT circuit 84 to be returned to the original image data.

This image data is input to a DCT block reordering circuit 85. The DCT block reordering circuit 85 reorders this data corresponding to the DCT flag and prediction flag so that it is reordered in the same order of data which a motion compensating circuit 88 outputs to an operator 86 and outputs it to the operator 86.

When the image data supplied from the DCT block reordering circuit 85 is I picture data, the data is output from the operator 86 and is supplied to and stored in a forward prediction image section 87a in a frame memory 87 to generate prediction image data for image data succeedingly input to the operator 86 (data of P or B picture). This data is also output to the format converting circuit 32 (FIG. 6).

When the image data supplied from the DCT block reordering circuit 85 is data of P picture whose prediction image data is image data of one frame before it (two frames before it for the original image sequence) and is data in the forward prediction mode, image data of one frame before it (I picture data) stored in the forward prediction image section 87a in the frame memory 87 is read and is motion compensated by the motion compensating circuit 88 corresponding to the motion vector output from the variable length decoding circuit 82. Then, it is added with the image data (data of difference) supplied from the DCT block reordering circuit 85 in the operator 86 and is output. This added data, i.e., decoded P picture data, is supplied to and stored in a rearward prediction image section 87b in the frame memory 87 to generate prediction image data for the image data (data of B picture or P picture) succeedingly input to the operator 86.

Data in the intra-image prediction mode is not specifically processed in the operator 86 and is stored in the rearward prediction image section 87b as it is similarly to I picture data even if it is P picture data.

Because this P picture is the image to be displayed next to the next B picture, it is not output to the format converting circuit 32 yet at this stage (as described above, P picture input after B picture is processed and transmitted before the B picture).

When the image data supplied from the DCT block reordering circuit 85 is B picture data, image data of I picture stored in the forward prediction image section 87a of the frame memory 87 (in the case of the forward prediction mode), image data of P picture stored in the rearward prediction image section 87b of the frame memory 87 (in the case of the rearward prediction mode) or image data of the both (in the case of the bi-directional prediction mode) is read corresponding to the prediction mode supplied from the variable length decoding circuit 82 and is motion compensated in the motion compensating circuit 88 corresponding to the motion vector output from the variable length decoding circuit 82 to produce a prediction image. However, when no motion compensation is necessary (in the case of the intra-image prediction mode), no prediction image is produced.

The data thus motion compensated by the motion compensating circuit 88 is added with the output of the DCT block reordering circuit 85 in the operator 86. The added output is output to the format converting circuit 32.

However, because this added output is data of B picture and is not used for producing a prediction image for another image, it is not stored in the frame memory 87.

After when the image of B picture is output, the image data of P picture stored in the rearward prediction image section 87b is read and is supplied to the format converting circuit 32 via the motion compensating circuit 88 and the operator 86. However, no motion compensation is carried out at this time.

Figure 8:
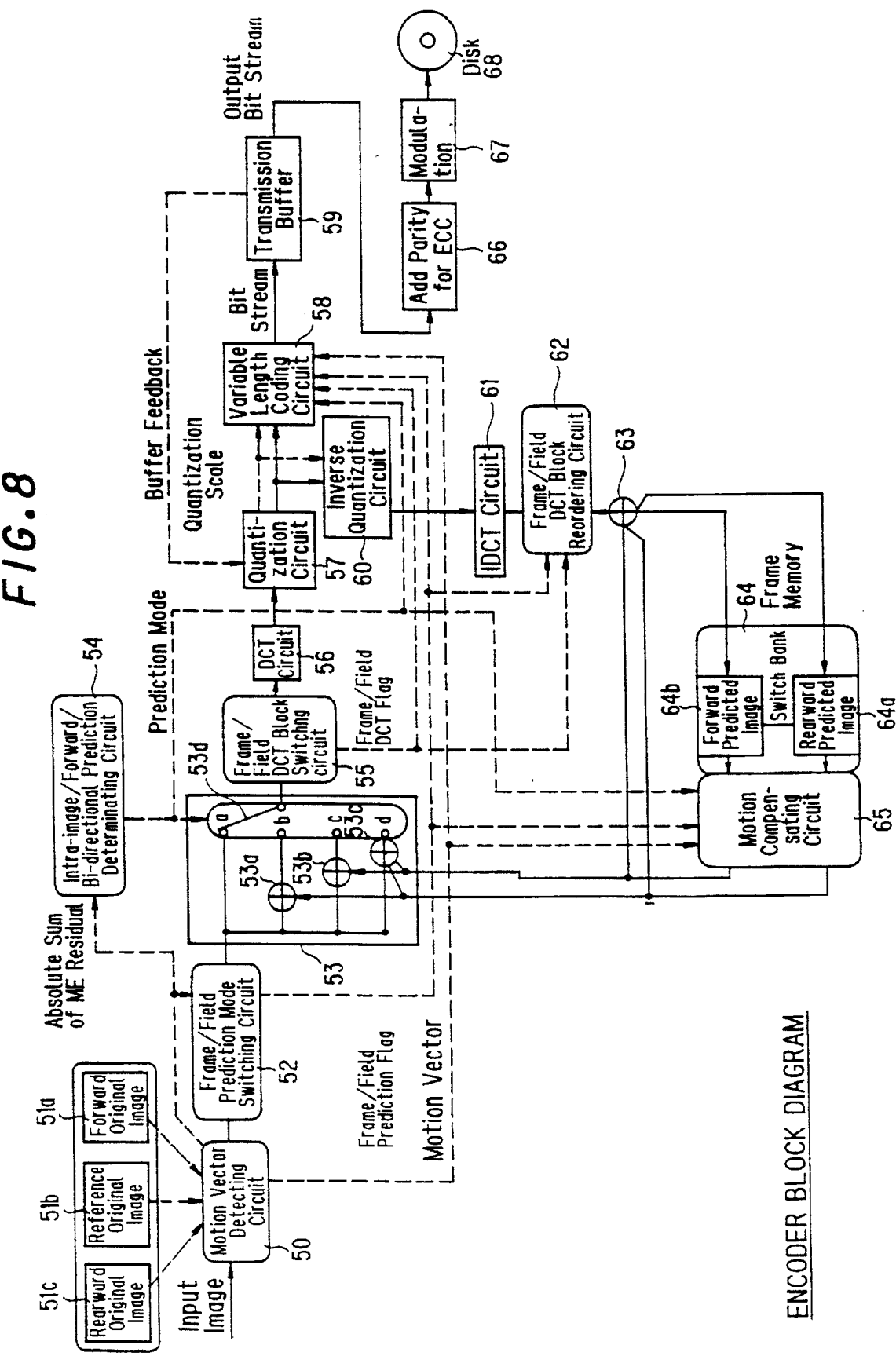
FIG. 8 is a block diagram showing an exemplary structure of an encoder 18 in FIG. 6.

By the way, although circuits which correspond to the prediction mode switching circuit 52 and the DCT mode switching circuit 55 in the encoder 18 in FIG. 8 are not shown in the decoder 31, the motion compensating circuit 88 runs the process which corresponds to those circuits, i.e., the process for returning the composition in which signals in the odd field (image for left eye) and even field (image for right eye) lines are separated to the original composition in which they are mixed.

While the above explanation has been made concerning on the processing of luminance signals, the processing of color-difference signal is carried out in the same manner. In this case, however, for the motion vector, one which is cut into half of the motion vector for luminance signal in the vertical and horizontal directions is used.

In the embodiment described above, the data in the odd fields in which the image for left eye is disposed and the data in the even fields in which the image for right eye is disposed are adaptively switched to either state of the mixed state (frame prediction mode or frame DCT mode) or of the separated state (field prediction mode or field DCT mode) and are processed in the prediction mode switching circuit 52 and the DCT mode switching circuit 55. As a result, it allows to efficiently code without degrading the image quality as compare to the prior art case in which the image for left eye and image for right eye are processed in the state always mixed.

Figure 14:
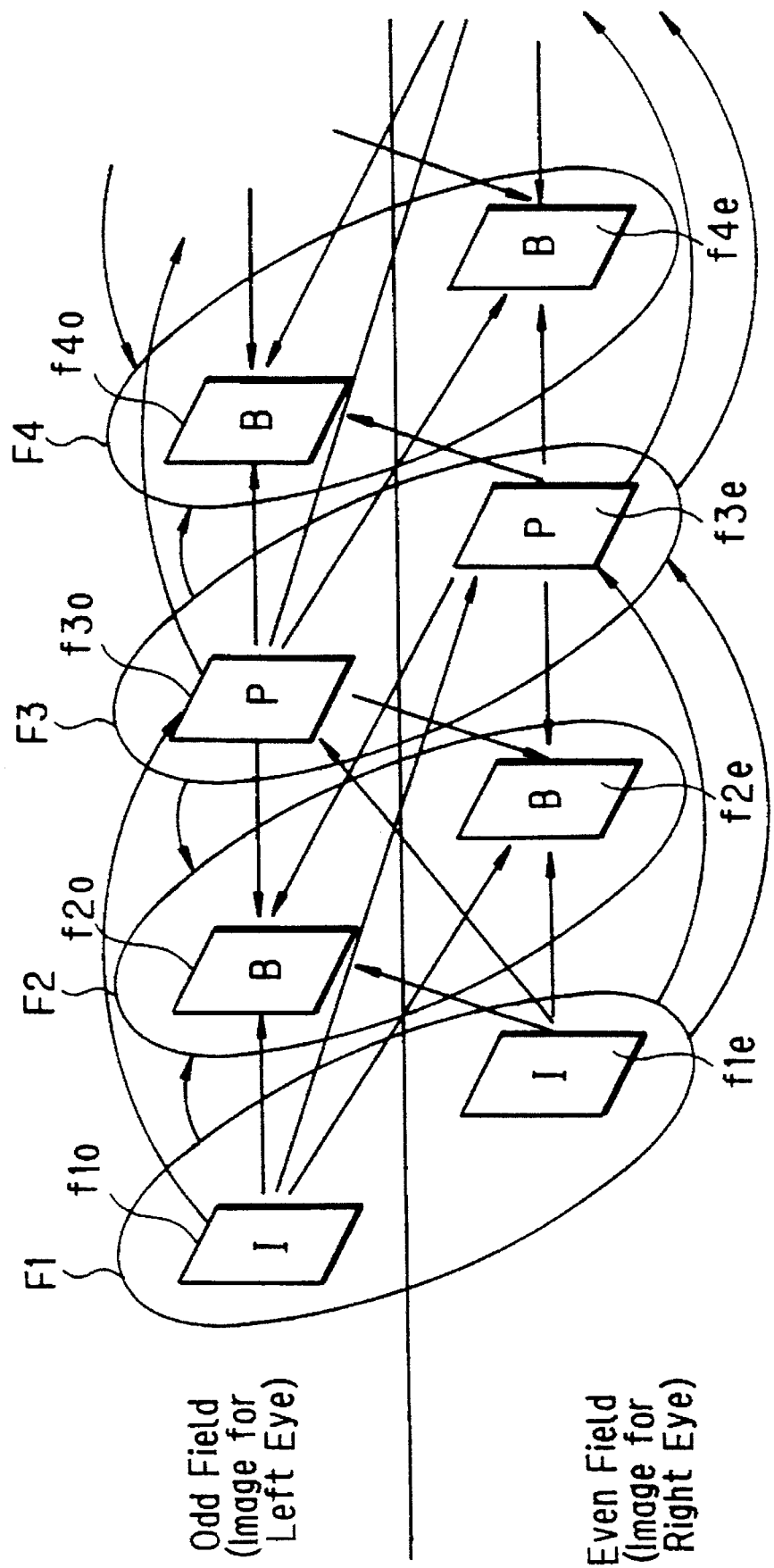
FIG. 14 is a diagram for explaining a coding of a stereo image using a frame/field prediction.

FIG. 14 diagramatically shows the images processed by the embodiment described above. As shown in the figure, while each of the frames F1 through F4 are sequentially processed in an order of I picture, B picture, P picture and B picture, the image for left eye in the odd fields and image for right eye in the even fields composing each frame are adaptively separately processed.

That is, an image for left eye f2o in the odd field of the frame F2 is predicted from at least either one of four fields of an image for left eye f1o in the odd field and an image for right eye f1e in the even field of the frame F1 which is one frame before it and an image for left eye f3o in the odd field and an image for right eye f3e in the even field of the frame F3 which is one frame after it. The image for left eye f3o in the odd field of the frame F3 is predicted from at least either one of the image for left eye f1o in the odd field or the image for right eye f1e in the even field of the frame F1 which is two frames before it.

Figure 15:
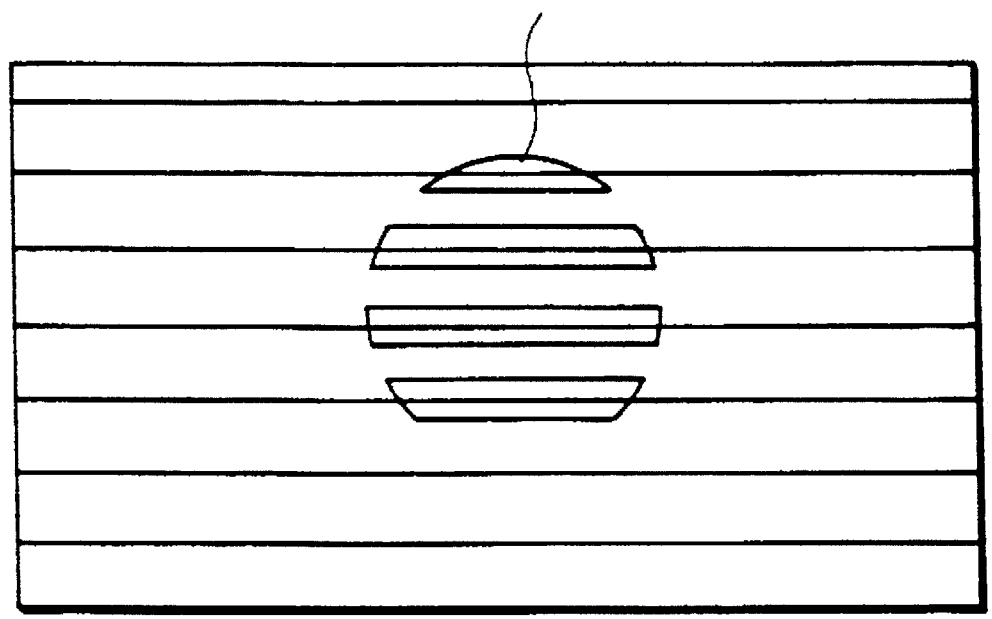
FIG. 15 is a drawing for explaining an image for left eye of the stereo image.
Figure 16:
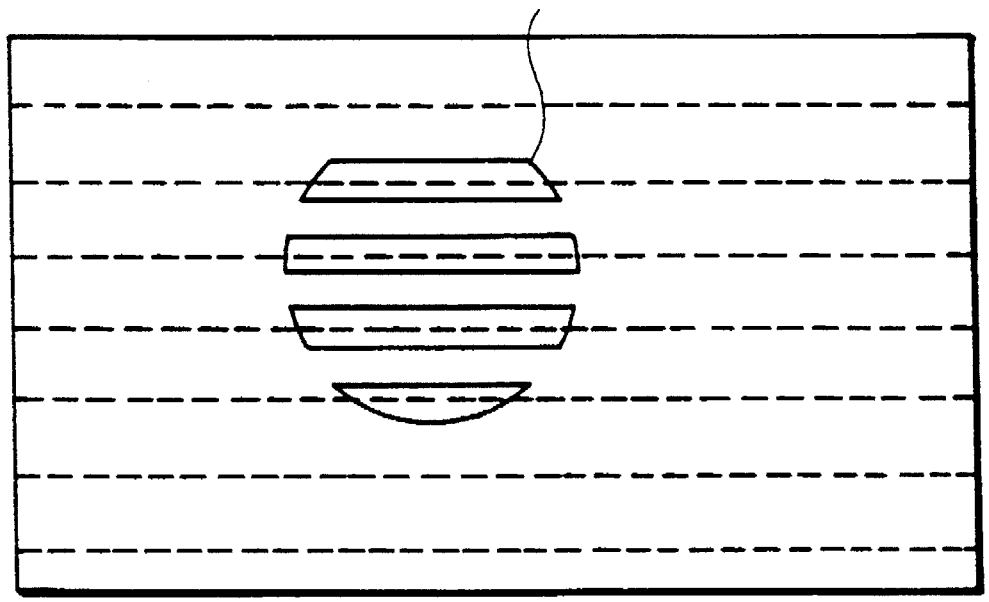
FIG. 16 is a drawing for explaining an image for right eye of the stereo image.
Figure 23:
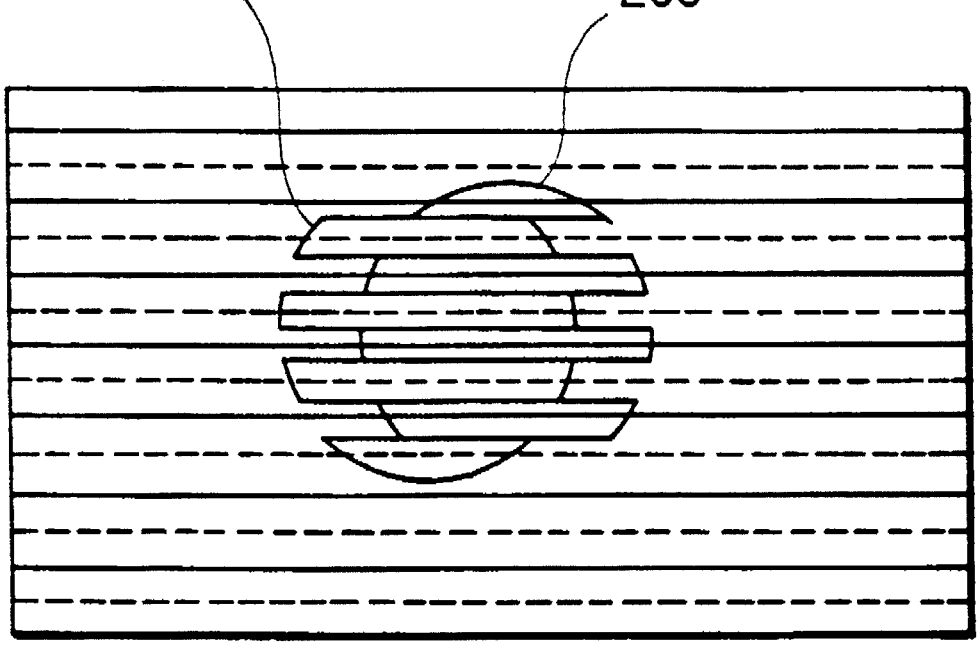
FIG. 23 is a drawing showing an example of stereo image.

As a result, in the field prediction mode or field DCT mode, the image for right eye 206 and image for left eye 205 are independently processed as shown in FIGS. 15 and 16. Accordingly, it allows to eliminate the heavy interlaced structure which corresponds to the parallax shown in FIG. 23 and to code the image efficiently without degrading the image quality.

Figure 17:
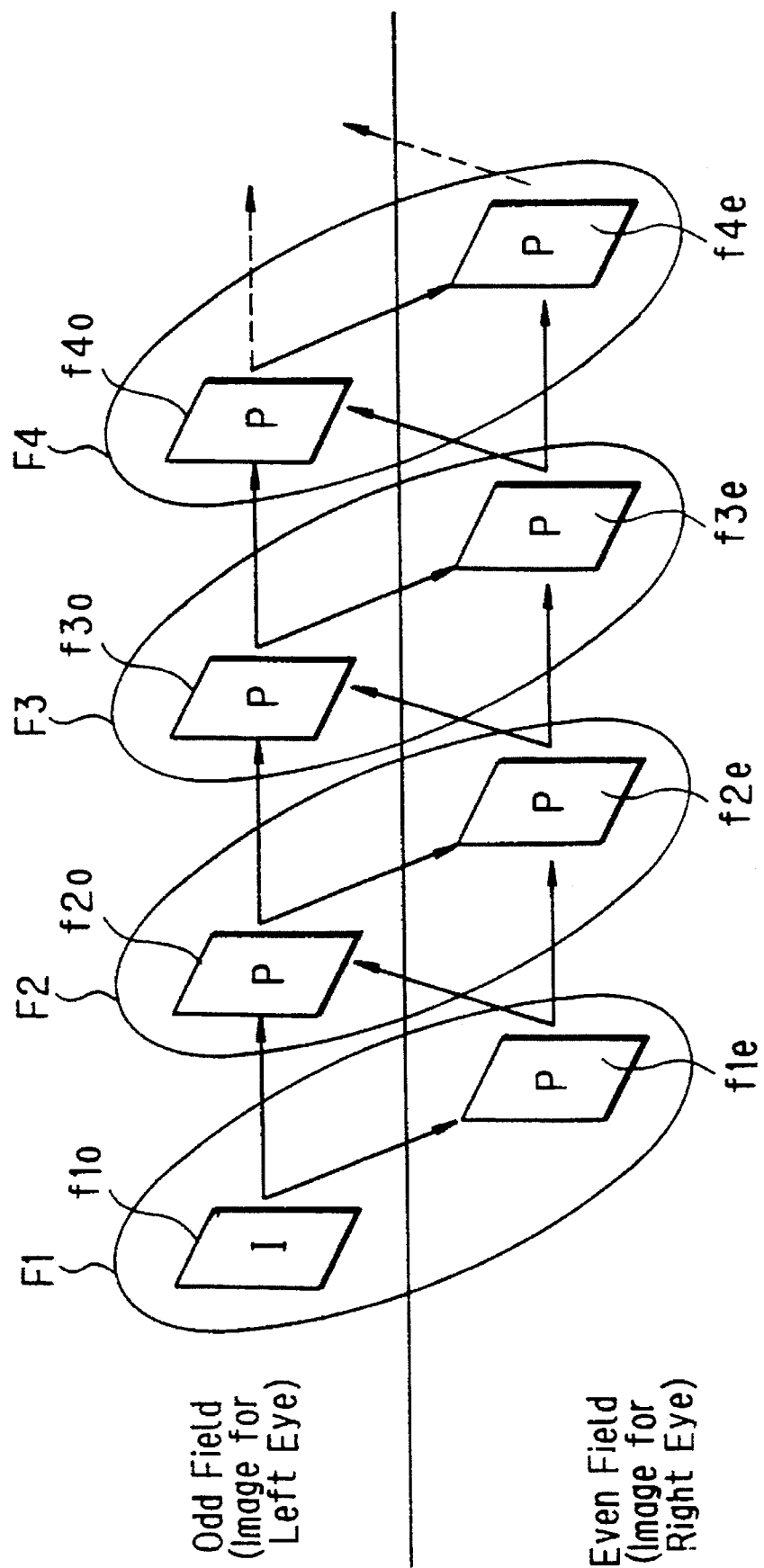
FIG. 17 is a diagram for explaining a coding of a stereo image using a field prediction.

While the unit of the processing of I, P or B picture has been a frame, it may be a field. FIG. 17 shows an embodiment of this case. That is, in the present embodiment, the image for left eye f1o in the odd fields composing the frame F1 is processed as I picture and the image for right eye f1e in the even fields is processed as P picture. Then, image for left eyes f2o, f3o and f4o in the odd fields and image for right eyes f2e, f3e and f4e in the even fields of the following frames F2 through F4 are all processed as P picture. Then, while the image for right eye f1e in the even field of the frame F1 designates the image for left eye f1o in the odd field of the same frame F1 as its prediction image, the other image in each field designates pictures of two fields immediately before it as its prediction image.

Such prediction allows to improve the prediction efficiency further as compare to predicting a stereo image by frame.

Figure 18:
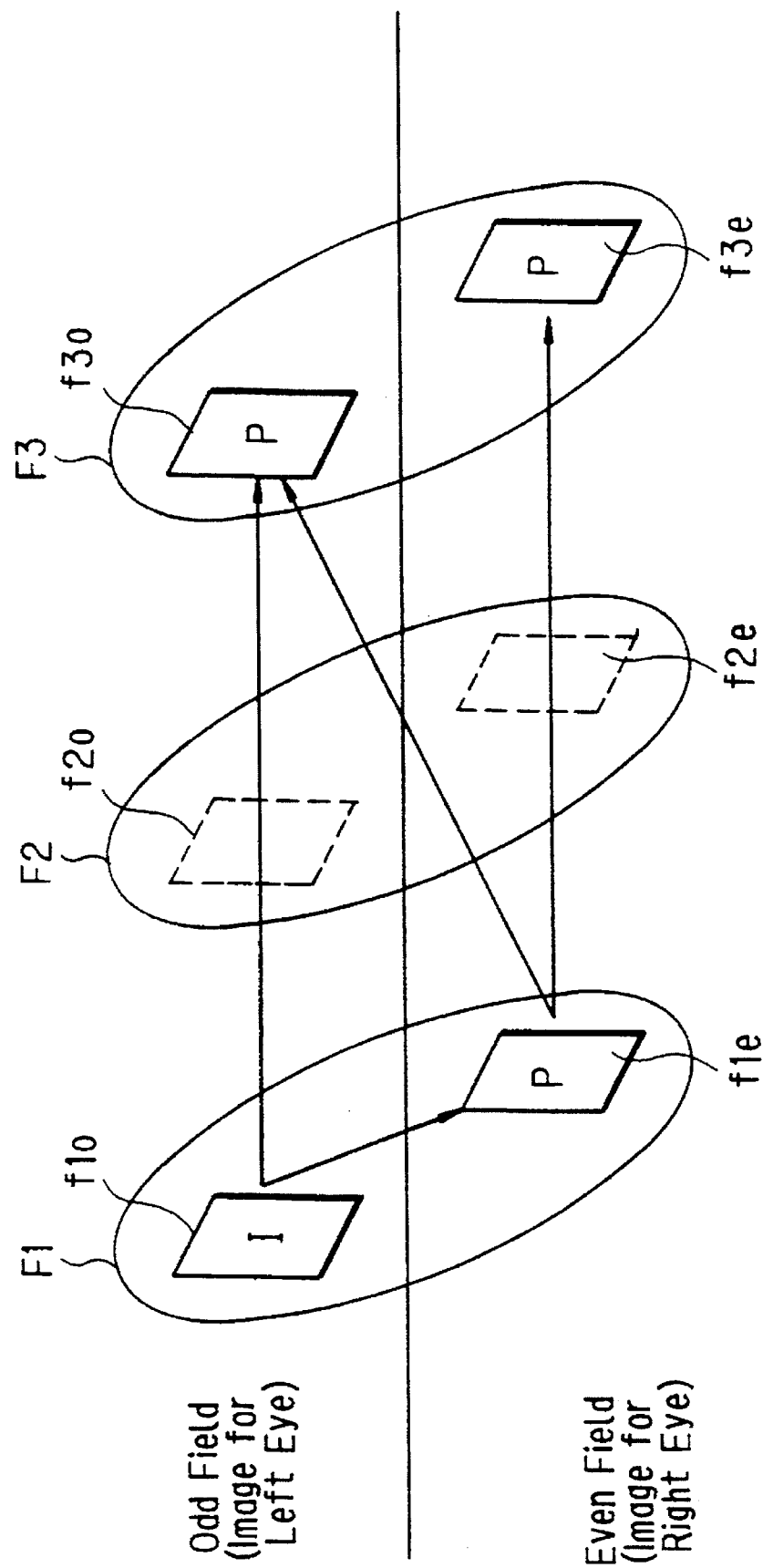
FIG. 18 is a diagram for explaining a coding of a stereo image using a field prediction.
Figure 19:
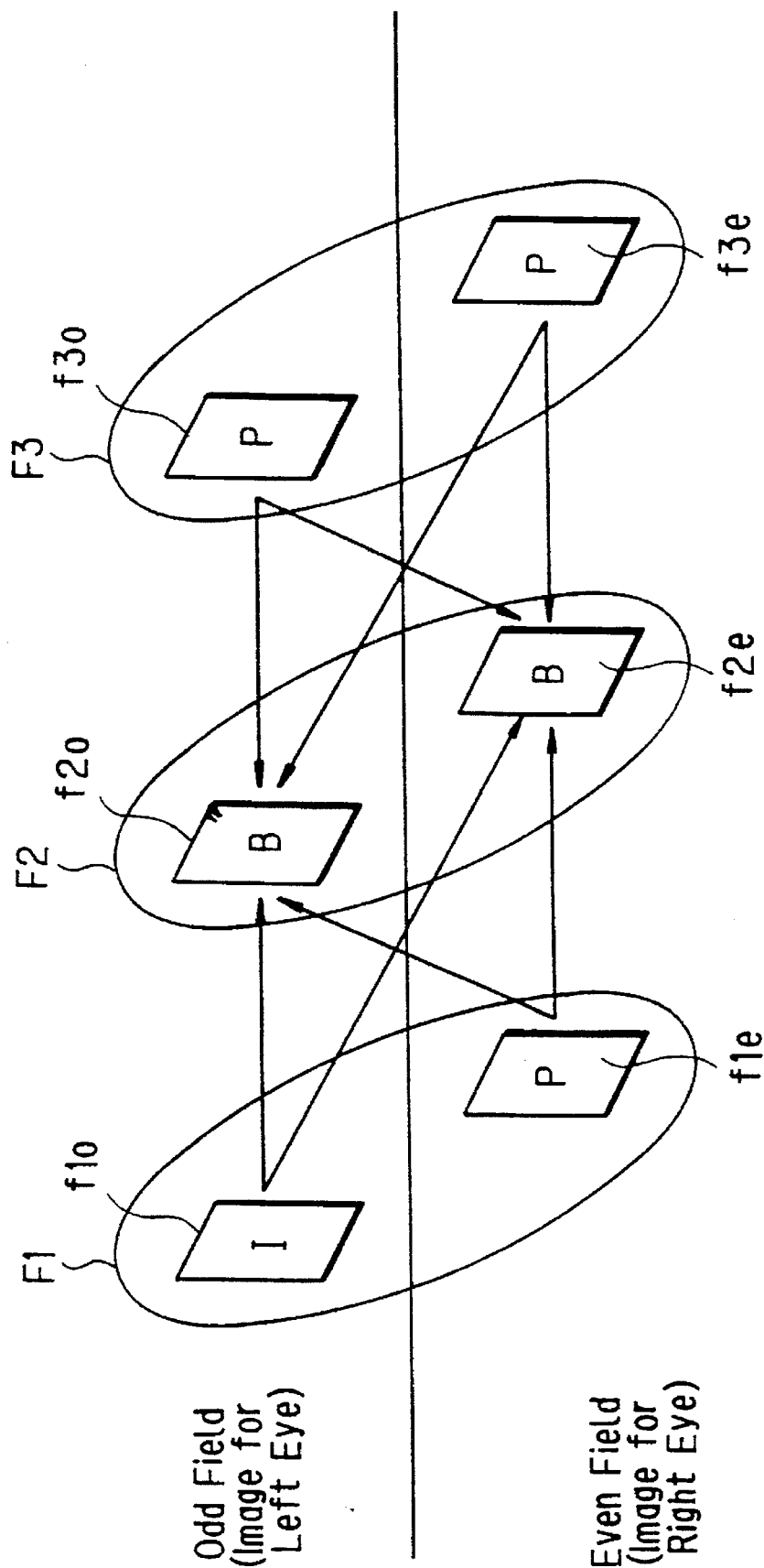
FIG. 19 is a diagram for explaining a coding of a stereo image using a field prediction.

FIGS. 18 and 19 show still another embodiment. In the present embodiment, the image for left eye f1o in the odd field of the first frame F1 is I picture and the image for right eye f1e in the even field is P picture. In the next frame F2, the image for left eye f2o in the odd field and the image for right eye f2e in the even field are both processed as B picture and in the frame F3, the image for left eye f3o in the odd field and the image for right eye f3e in the even field are both processed as P picture. In the frames thereafter, pictures in both fields are alternately processed as B picture or P picture.

The image for right eye f1e in the even field of the frame F1 designates the image for left eye f1o in the odd field in the same frame F1 as its prediction image. Then, P picture in each field of the frame F3 and thereafter designates two pictures of I picture or P picture (field) immediately before it as its prediction image.

B picture in each field designates I or P picture (field) immediately before or after it as its prediction image.

The unit of processing of the I picture, P picture and B picture is a field also in the present embodiment. Accordingly, the image for left eye and image for right eye are not processed in the state wherein they are mixed and it becomes possible to improve the prediction efficiency more than the embodiment shown with reference to FIG. 17.

In such processing, the prediction mode switching circuit 52 and the DCT mode switching circuit 55 (and accordingly the DCT block reordering circuit 62) shown in FIG. 8 may be eliminated. Or, the field prediction mode or field DCT mode may be fixed.

Figure 20:
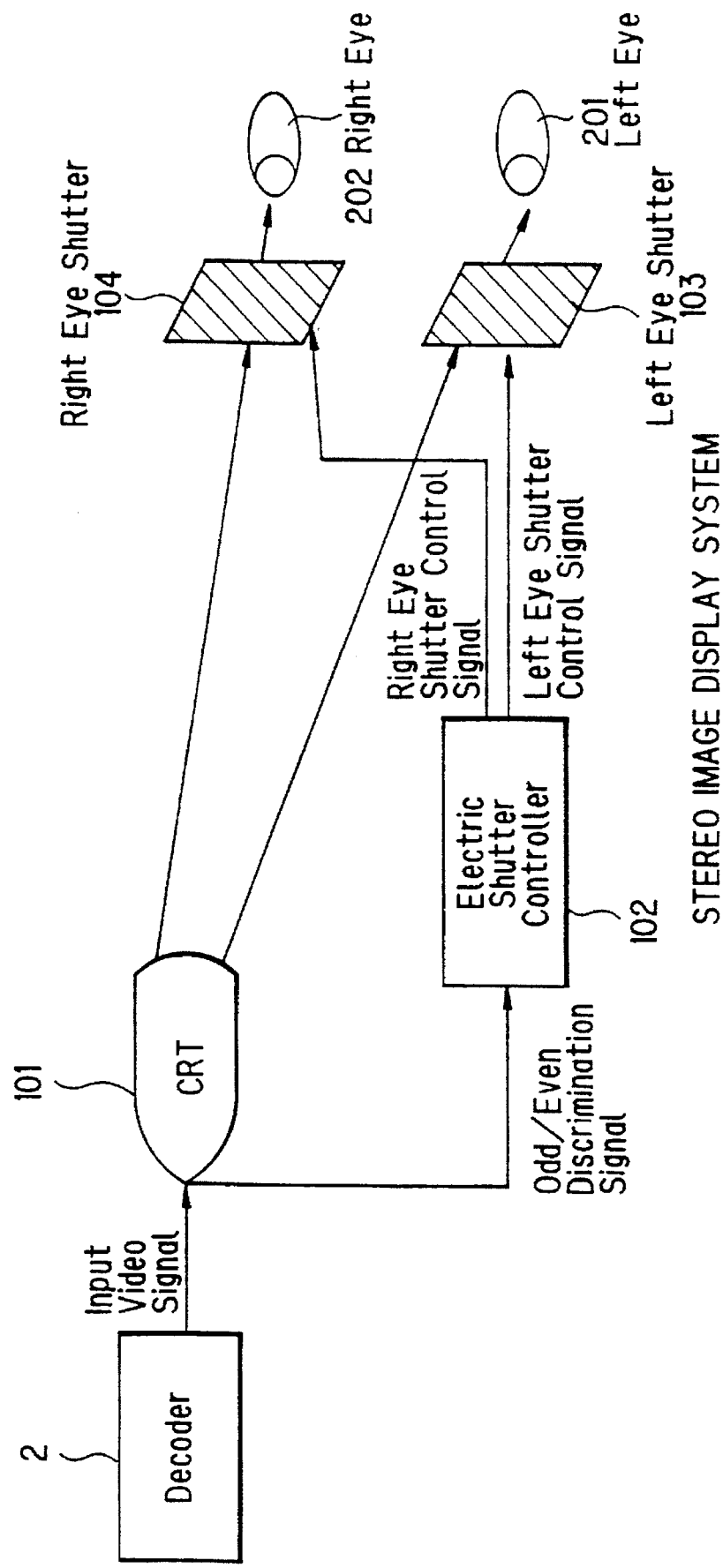
FIG. 20 is a drawing showing an exemplary structure of a stereo image display system.
Figure 22:
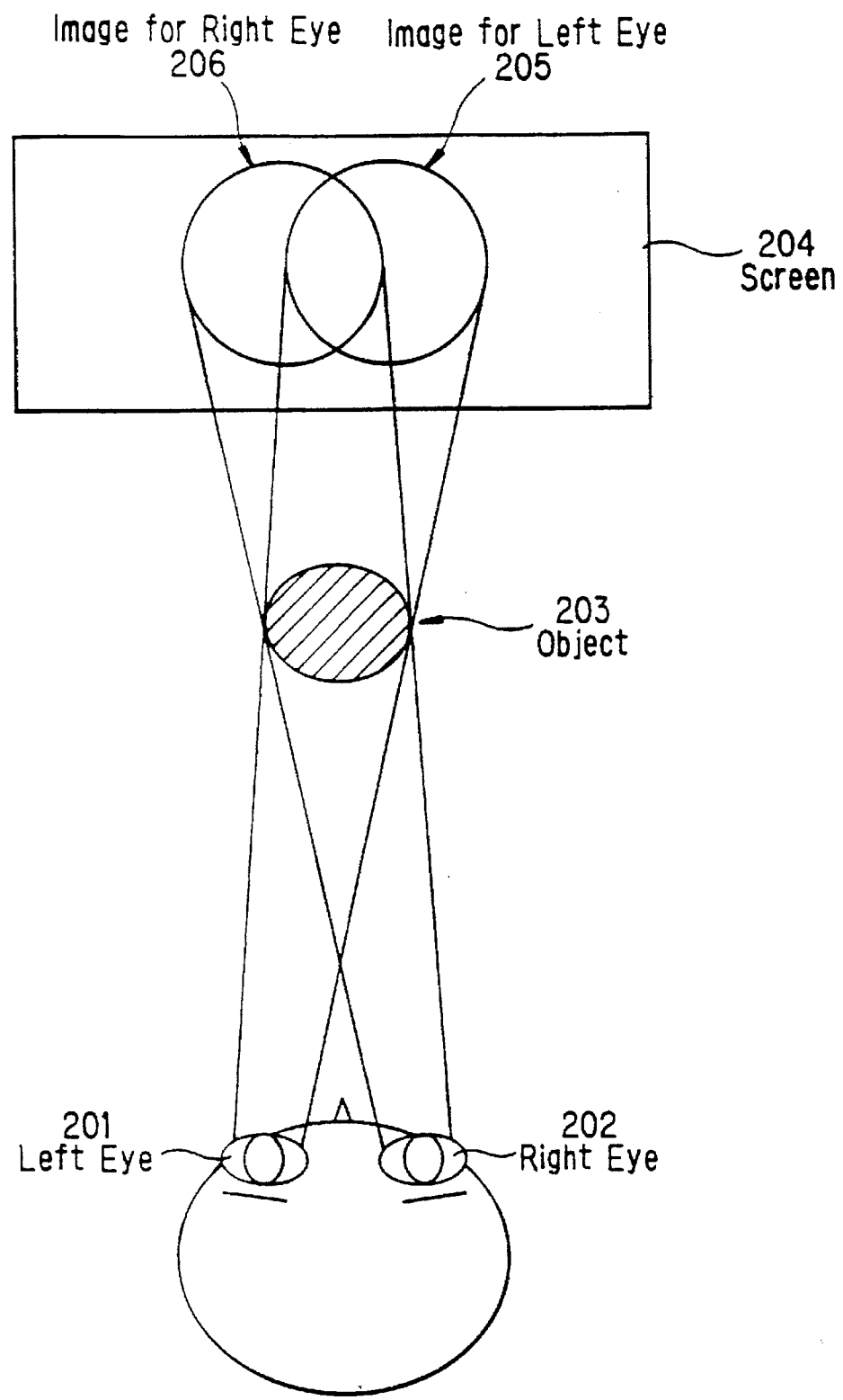
FIG. 22 is a drawing for explaining a principle of stereo image.

The video signal thus decoded by the decoding unit 2 is output to and displayed on a CRT 101 shown in FIG. 20 for example. As described above, the image for left eye is disposed in the odd fields and the image for right eye is disposed in the even fields, respectively in the video signal. Due to that, a discrimination signal for discriminating the odd and even fields of the video signal supplied to the CRT 101 is supplied to an electronic shutter controller 102.

The electronic shutter controller 102 opens a left eye shutter 103 and closes a right eye shutter 104 when the image for left eye in the odd fields is displayed on the CRT 101 as shown in FIG. 21. It opens the right eye shutter 104 and closes the left eye shutter 103 when the image for right eye in the even fields is displayed on the CRT 101. As a result, the image for left eye in the odd fields displayed on the CRT 101 is input to a left eye 201 and the image for right eye in the even fields is input to a right eye 202: they are forbidden from entering the other eye, respectively. As a result, an observer can recognize this displayed image as a stereo image.

Although the image for left eye has been disposed in the odd fields and the image for right eye has been disposed in the even fields in the embodiments described above, the image for left eye may be disposed in the even fields and the image for right eye may be disposed in the odd fields.

As described above, accordingly to the present invention, the image for left eye and image for right eye produced by the stereoscopic are disposed respectively in the first and second fields of the TV signal. Then, they are predictively coded or DCT transformed per field. Or they are predictively coded or DCT transformed adaptively per field or frame. Accordingly, the stereo image may be efficiently coded without degrading its image quality.

While the preferred embodiments have been described, variations thereto will occur to those skilled in the art within the scope of the present inventive concepts which are delineated by the following claims.

What is claimed is:

1. An image signal coding method, comprising the steps of:

receiving a first image signal and a second image signal, said first and second image signals representing stereoscopic images perceived by left and right eyes;

producing a stereo image signal from said first and second image signals, said stereo image signal including frames, each of said frames having a first field corresponding to said first image signal and a second field corresponding to said second image signal;

dividing each of said frames of said stereo image signal into units of blocks;

selecting either a first prediction mode or a second prediction mode;

frame prediction encoding, when said first prediction mode is selected, each of said frames to produce a predictively coded signal;

field prediction encoding, when said second prediction mode is selected, said first and second fields of a frame using data from other first or second fields of a frame to produce said predictively coded signal;

orthogonally transforming the predictively coded signal to produce an orthogonally transformed signal;

quantizing the orthogonally transformed signal to produce a quantized signal; and variable length coding the quantized signal.

2. The image signal coding method according to claim 1 wherein said stereo image signal includes groups of frames, each group having a plurality of frames, and the step of field prediction encoding is carried out by producing a predictively coded signal such that the first and second fields of a first one of said frames in said each group are both intracoded to produce intraframe encoded pictures, the first and second fields of a second one of said frames are both bidirectionally-predictively coded to produce bidirectional-predictive-encoded pictures, and the first and second fields of a third one of said frames are both predictively coded to produce predictive-encoded pictures.

3. The image signal coding method of claim 1, wherein the step of field prediction encoding is carried out by field prediction encoding the first field of a frame from either a first field or a second field of one of said frames, and by field prediction encoding the second field of said frame from either a first field or a second field of one of said frames.

4. An image signal coding apparatus, comprising:

means for receiving a first image signal and a second image signal, said first and second image signals representing stereoscopic images perceived by left and right eyes;

means for producing a stereo image signal from said first and second image signals, said stereo image signal including frames, each of said frames having a first field corresponding to said first image signal and a second field corresponding to said second image signal;

means for dividing each of said frames of said stereo image signal into units of blocks means for selecting either a first prediction mode or a second prediction mode;

means for frame prediction encoding, when said first prediction mode is selected, each of said frames to produce a predictively coded signal;

means for field prediction encoding, when said second prediction mode is selected, said first and second fields of a frame using data from other first or second fields of a frame to produce said predictively coded signal;

means for orthogonally transforming the predictively coded signal to produce an orthogonally transformed signal;

quantization means for quantizing the orthogonally transformed signal to produce a quantized signal; and variable length coding means for variable length coding the quantized signal.

5. The image signal coding apparatus according to claim 4, wherein said stereo image signal includes groups of frames, each group having a plurality of frames, and the step of field prediction encoding is carried out by producing a predictively coded signal such that the first and second fields of a first one of said frames in said each group are both intracoded to produce intraframe encoded pictures, the first and second fields of a second one of said frames are both bidirectionally-predictively coded to produce bidirectional-predictive-encoded pictures, and the first and second fields of a third one of said frames are both predictively coded to produce predictive-encoded pictures.

6. The image signal coding apparatus of claim 4, wherein the means for field prediction encoding is operable to field prediction encode the first field of a frame from either a first field or a second field of one of said frames, and to field prediction encode the second field of said frame from either a first field or a second field of one of said frames.

7. An image signal decoding method for decoding a coded stereo image signal produced from first and second image signals representing stereoscopic images perceived by left and right eyes, said stereo image signal including frames, each of said frames having a first field corresponding to said first image signal and a second field corresponding to said second image signal, each of said frames being either frame prediction encoded or field prediction encoded and having a respective prediction flag indicating the type of prediction coding, and each of said field prediction encoded frames having encoded first and second fields encoded using data from other first or second fields of a frame, the decoding method comprising steps of:

variable length decoding the coded stereo image signal to produce a variable length decoded signal;

separating each said prediction flag from said coded stereo image signal;

inversely quantizing the variable length decoded signal to produce an inverse quantized signal;

inverse orthogonally transforming the inverse quantized signal;

producing a prediction error signal corresponding to the orthogonally transformed signal based on said prediction flag; and decoding the orthogonally transformed signal using said prediction error signal.

8. An image signal decoding apparatus for decoding a coded stereo image signal produced from first and second image signals representing stereoscopic images perceived by left and right eyes, said stereo image signal including frames, each of said frames having a first field corresponding to said first image signal and a second field corresponding to said second image signal, each of said frames being either frame prediction encoded or field prediction encoded and having a respective prediction flag indicating the type of prediction coding, and each of said field prediction encoded frames having encoded first and second fields encoded using data from other first or second fields of a frame, the decoding apparatus comprising:

variable length decoding means for variable length decoding the coded stereo image signal to produce a variable length decoded signal and for separating each said prediction flag from said coded stereo image signal;

inverse quantization means for inversely quantizing the variable length decoded signal to produce an inverse quantized signal;

means for inverse orthogonally transforming the inverse quantized signal;

producing means for producing a prediction error signal corresponding to the inverse orthogonally transformed signal based on said prediction flag; and decoding means for decoding the inverse orthogonally transformed signal using said prediction error signal.

9. An image signal coding method, comprising the steps of:

receiving a first image signal and a second image signal, said first and second image signals representing stereoscopic images perceived by left and right eyes;

producing a stereo image signal from said first and second image signals, said stereo image signal including frames, each of said frames having a first field corresponding to said first image signal and a second field corresponding to said second image signal;

predictively coding said stereo image signal to produce a predictively coded signal;

selecting either a first transformation mode or a second transformation mode;

dividing each frame of the predictively coded signal into units of blocks, each of said blocks including data of both said first and second fields when said first transformation mode is selected, and each of said blocks corresponding to only one of said first and second fields when said second transformation mode is selected;

orthogonally transforming the blocks of the predictively coded signal to produce an orthogonally transformed signal;

quantizing the orthogonally transformed signal to produce a quantized signal; and variable length coding the quantized signal.

10. The image signal coding method according to claim 9, wherein said step of orthogonally transforming is carried out by discrete cosine transforming the blocks to produce a discrete cosine transformed signal.

11. An image signal coding apparatus, comprising:

means for receiving a first image signal and a second image signal, said first and second image signals representing stereoscopic images perceived by left and right eyes;

producing a stereo image signal from said first and second image signals, said stereo image signal including frames, each of said frames having a first field corresponding to said first image signal and a second field corresponding to said second image signal;

predictive coding means for predictively coding said stereo image signal to produce a predictively coded signal;

means for selecting either a first transformation mode or a second transformation mode;

means for dividing each frame of the predictively coded signal into units of blocks, each of said blocks including data of both said first and second fields when said first transformation mode is selected, and each of said blocks corresponding to only one of said first and second fields when said second transformation mode is selected;

means for orthogonally transforming the blocks of the predictively coded signal to produce an orthogonally transformed signal;

quantization means for quantizing the orthogonally transformed signal to produce a quantized signal; and variable length coding means for variable length coding the quantized signal.

12. The image signal coding apparatus according to claim 11, wherein said means for orthogonally transforming is a discrete cosine transformer.

13. An image signal decoding method for decoding a coded stereo image signal produced from first and second image signals representing stereoscopic images perceived by left and right eyes, said stereo image signal including frames, each of said frames having a first field corresponding to said first image signal and a second field corresponding to said second image signal, each of said frames being divided into units of blocks each corresponding to both first and second fields of the respective frame in a first transformation mode and being divided into units of blocks each corresponding to either only said first or second field of the respective frame in a second transformation mode, and having a respective transformation flag indicating the transformation mode during coding, the decoding method comprising steps of:

variable length decoding the coded stereo image signal to produce a variable length decoded signal;

separating each said transformation flag from said coded stereo image signal;

inversely quantizing the variable length decoded signal to produce an inverse quantized signal;

inverse orthogonally transforming the inverse quantized signal to produce an inverse transformed signal;

producing a prediction error signal corresponding to the inverse transformed signal based on said transformation flag; and decoding the inverse transformed signal using said prediction error signal.

14. The image signal decoding method according to claim 13, wherein said coded stereo image signal includes groups of frames, each group having a plurality of frames, the first and second fields of a first one of said frames in said each group are both intraframe encoded pictures, the first and second fields of a second one of said frames are both bidirectional-predictive-encoded pictures, and the first and second fields of a third one of said frames are both predictive-encoded pictures.

15. An image signal decoding apparatus for decoding a coded stereo image signal produced from first and second image signals representing stereoscopic images perceived by left and right eyes, said stereo image signal including frames, each of said frames having a first field corresponding to said first image signal and a second field corresponding to said second image signal, each of said frames being divided into units of blocks each corresponding to both first and second fields of the respective frame in a first transformation mode and being divided into units of blocks each corresponding to either only said first or second field of the respective frame in a second transformation mode, and having a respective transformation flag indicating the transformation mode during coding, said decoding apparatus comprising:

variable length decoding means for variable length decoding the coded stereo image signal and for separating each said transformation flag from said coded stereo image signal;

inverse quantization means for inversely quantizing the variable length decoded signal to produce an inverse quantized signal;

means for inverse orthogonally transforming the inverse quantized signal to produce an inverse transformed signal;

producing means for producing a prediction error signal corresponding to the inverse transformed signal based on said transformation flag; and decoding means for decoding the inverse transformed signal using said prediction error signal.

16. The image signal decoding according to claim 15, wherein said stereo image signal includes groups of frames, each group having a plurality of frames, the first and second fields of a first one of said frames in said each group are both intraframe encoded pictures, the first and second fields of a second one of said frames are both bidirectional-predictive-encoded pictures, and the first and second fields of a third one of said frames are both predictive-encoded pictures.

17. An image signal coding method, comprising the steps of:

receiving a first image signal and a second image signal, said first and second image signals representing stereoscopic images perceived by left and right eyes;

producing a stereo image signal from said first and second image signals, said stereo image signal including groups of frames, each group having a plurality of frames, each of said frames having a first field corresponding to said first image signal and a second field corresponding to said second image signal;

coding each said first and second fields of each said frame in each said group of said stereo image signal to produce a predictively coded signal, said first field of a first one of said frames in said each group being intracoded to produce an intraframe encoded picture, said second field of said first one of said frames being predictively coded to produce a predictive-encoded picture, and said first and second fields of a second one of said frames in said each group being predictively coded to produce predictive-encoded pictures, and said first field of said second frame in said each group being predictively coded using a selected one of said first and second fields of said first frame as a prediction image signal;

orthogonally transforming the predictively coded signal to produce an orthogonally transformed signal;

quantizing the orthogonally transformed signal to produce a quantized signal; and variable length coding the quantized signal.

18. The image signal coding method of claim 17, wherein said second field of each except the first of said frames in said each group is predictively coded using a selected one of said first field of the respective frame and said second field of a previous frame as the prediction image signal.

19. An image signal coding apparatus, comprising the steps of:

means for receiving a first image signal and a second image signal, said first and second image signals representing stereoscopic images perceived by left and right eyes;

means for producing a stereo image signal from said first and second image signals, said stereo image signal including groups of frames, each group having a plurality of frames, each of said frames having a first field corresponding to said first image signal and a second field corresponding to said second image signal;

predictive coding means for coding each said first and second fields of each said frame in each said group of said stereo image signal to produce a predictively coded signal, said first field in a first one of said frames in said each group being intracoded to produce an intraframe encoded picture, said second field of said first one of said frames being predictively coded to produce a predictive-encoded picture, and said first and second fields of a second one of said frames in said each group being predictively coded to produce predictive-encoded pictures, and said first field of said second frame in said each group being predictively coded using a selected one of said first and second fields of said first frame as a prediction image signal;

means for orthogonally transforming the predictively coded signal to produce an orthogonally transformed signal;

quantization means for quantizing the orthogonally transformed signal to produce a quantized signal; and variable length coding means for variable length coding the quantized signal.

20. The image signal coding apparatus of claim 19, wherein said predictive coding means is operable to predictively code the second field of each except the first of said frames in said each group using a selected one of said first field of the respective frame and said second field of a previous frame as the prediction image signal.

21. An image signal decoding method for decoding a coded stereo image signal produced from first and second image signals representing stereoscopic images perceived by left and right eyes, said stereo image signal including groups of frames, each group having a plurality of frames, each of said frames having a first field corresponding to said first image signal and a second field corresponding to said second image signal, said first field in a first one of said frames in said each group being an intraframe encoded picture, said second field of said first one of said frames being a predictive-encoded picture, and said first and second fields of a second one of said frames in said each group being predictive-encoded pictures, and said first field of said second frame in said each group being predictively coded using a selected one of said first and second fields of said first frame as a prediction image signal, the decoding method comprising steps of:

variable length decoding the coded stereo image signal to produce a variable length decoded signal;

inversely quantizing the variable length decoded signal to produce an inverse quantized signal;

inverse orthogonally transforming the inverse quantized signal;

producing a prediction error signal corresponding to the orthogonally transformed signal; and decoding the orthogonally transformed signal using said prediction error signal.

22. An image signal decoding apparatus for decoding a coded stereo image signal produced from first and second image signals representing stereoscopic images perceived by left and right eyes, said stereo image signal including groups of frames, each group having a plurality of frames, each of said frames having a first field corresponding to said first image signal and a second field corresponding to said second image signal, said first field in a first one of said frames in said each group being an intraframe encoded picture, said second field of said first one of said frames being a predictive-encoded picture, and said first and second fields of a second one of said frames in said each group being predictive-encoded pictures, and said first field of said second frame in said each group being predictively coded using a selected one of said first and second fields of said first frame as a prediction image signal, the decoding apparatus comprising:

variable length decoding means for variable length decoding the coded stereo image signal to produce a variable length decoded signal;

inverse quantization means for inversely quantizing the variable length decoded signal to produce an inverse quantized signal;

means for inverse orthogonally transforming the inverse quantized signal;

producing means for producing a prediction error signal corresponding to the orthogonally transformed signal; and decoding means for decoding the orthogonally transformed signal using said prediction error signal.

23. An image signal coding method, comprising the steps of:

receiving a first image signal and a second image signal, said first and second image signals representing stereoscopic images perceived by left and right eyes;

producing a stereo image signal from said first and second image signals, said stereo image signal including groups of frames, each group having a plurality of frames, each of said frames having a first field corresponding to said first image signal and a second field corresponding to said second image signal;

coding each said first and second fields of each said frame in each said group of said stereo image signal to produce a predictively coded signal, said first field of a first one of said frames in said each group being intracoded to produce an intraframe encoded picture, said second field of said first one of said frames being predictively coded to produce a predictive-encoded picture, said first and second fields of a second one of said frames in said each group being bidirectionally-predictively coded to produce bidirectional-predictive-encoded pictures, and said first and second fields of a third one of said frames in said each group being predictively coded to produce predictive-encoded pictures, and each of said first and second fields of said second frame in said each group being bidirectionally-predictively coded using first and second prediction image signals, said first prediction image signal corresponding to a selected one of said first and second fields of said first frame, and said second prediction image signal corresponding to a selected one of said first and second fields of said third frame;

orthogonally transforming the predictively coded signal to produce an orthogonally transformed signal;

quantizing the orthogonally transformed signal to produce a quantized signal; and variable length coding the quantized signal.

24. An image signal coding apparatus, comprising the steps of:

means for receiving a first image signal and a second image signal, said first and second image signals representing stereoscopic images perceived by left and right eyes;

means for producing a stereo image signal from said first and second image signals, said stereo image signal including groups of frames, each group having a plurality of frames, each of said frames having a first field corresponding to said first image signal and a second field corresponding to said second image signal;

predictive coding means each said first and second fields of each said frame in each said group of said stereo image signal to produce a predictively coded signal, said first field of a first one of said frames in said each group being intracoded to produce an intraframe encoded picture, said second field of said first one of said frames being predictively coded to produce a predictive-encoded picture, said first and second fields of a second one of said frames in said each group being bidirectionally-predictively coded to produce bidirectional-predictive-encoded pictures, and said first and second fields of a third one of said frames in said each group being predictively coded to produce predictive-encoded pictures, and each of said first and second fields of said second frame in said each group being bidirectionally-predictively coded using first and second prediction image signals, said first prediction image signal corresponding to a selected one of said first and second fields of said first frame, and said second prediction image signal corresponding to a selected one of said first and second fields of said third frame;

means for orthogonally transforming the predictively coded signal to produce an orthogonally transformed signal;

quantization means for quantizing the orthogonally transformed signal to produce a quantized signal; and variable length coding means for variable length coding the quantized signal.

25. An image signal decoding method for decoding a coded stereo image signal produced from first and second image signals representing stereoscopic images perceived by left and right eyes, said stereo image signal including groups of frames, each group having a plurality of frames, each of said frames having a first field corresponding to said first image signal and a second field corresponding to said second image signal, said first field of a first one of said frames in said each group being an intraframe encoded picture, said second field of said first one of said frames being a predictive-encoded picture, said first and second fields of a second one of said frames in said each group being bidirectional-predictive-encoded pictures, and said first and second fields of a third one of said frames in said each group being predictive-encoded pictures, and each of said first and second fields of said second frame in said each group being bidirectionally-predictively coded using first and second prediction image signals, said first prediction image signal corresponding to a selected one of said first and second fields of said first frame, and said second prediction image signal corresponding to a selected one of said first and second fields of said third frame, the decoding method comprising steps of:

variable length decoding the coded stereo image signal to produce a variable length decoded signal;

inversely quantizing the variable length decoded signal to produce an inverse quantized signal;

inverse orthogonally transforming the inverse quantized signal;

producing a prediction error signal corresponding to the orthogonally transformed signal; and decoding the orthogonally transformed signal using said prediction error signal.

26. An image signal decoding apparatus for decoding a coded stereo image signal produced from first and second image signals representing stereoscopic images perceived by left and right eyes, said stereo image signal including groups of frames, each group having a plurality of frames, each of said frames having a first field corresponding to said first image signal and a second field corresponding to said second image signal, said first field of a first one of said frames in said each group being an intraframe encoded picture, said second field of said first one of said frames being a predictive-encoded picture, said first and second fields of a second one of said frames in said each group being bidirectional-predictive-encoded pictures, and said first and second fields of a third one of said frames in said each group being predictive-encoded pictures, and each of said first and second fields of said second frame in said each group being bidirectionally-predictively coded using first and second prediction image signals, said first prediction image signal corresponding to a selected one of said first and second fields of said first frame, and said second prediction image signal corresponding to a selected one of said first and second fields of said third frame, the decoding apparatus comprising:

variable length decoding means for variable length decoding the coded stereo image signal to produce a variable length decoded signal;

inverse quantization means for inversely quantizing the variable length decoded signal to produce an inverse quantized signal;

means for inverse orthogonally transforming the inverse quantized signal;

producing means for producing a prediction error signal corresponding to the orthogonally transformed signal; and decoding means for decoding the orthogonally transformed signal using said prediction error signal.

* * * * *